(12) United States Patent
David et al.

(10) Patent No.: US 7,733,464 B2
(45) Date of Patent: Jun. 8, 2010

(54) VEHICLE MOUNTED NIGHT VISION IMAGING SYSTEM AND METHOD

(75) Inventors: Ofer David, Haifa (IL); Yehuda Borenstein, Haifa (IL)

(73) Assignee: Elbit Systems Ltd., Haifa (IL)

( * ) Notice: Subject to any disclaimer, the term of this patent is extended or adjusted under 35 U.S.C. 154(b) by 1411 days.

(21) Appl. No.: 10/523,340

(22) PCT Filed: Aug. 5, 2003

(86) PCT No.: PCT/IL03/00639

§ 371 (c)(1),
(2), (4) Date: Jan. 27, 2005

(87) PCT Pub. No.: WO2004/013654

PCT Pub. Date: Feb. 12, 2004

(65) Prior Publication Data

US 2005/0269481 A1    Dec. 8, 2005

Related U.S. Application Data

(60) Provisional application No. 60/400,707, filed on Aug. 5, 2002.

(51) Int. Cl.
   *G01C 3/08* (2006.01)
(52) U.S. Cl. .................................................. 356/5.03
(58) Field of Classification Search ....... 356/3.01–3.15, 356/4.01–4.1, 5.01–5.15, 6–22, 128, 128.5, 356/139.09, 139.1
   See application file for complete search history.

(56) References Cited

U.S. PATENT DOCUMENTS

| | | | |
|---|---|---|---|
| 3,947,119 A | 3/1976 | Bamberg et al. | |
| 4,643,564 A | 2/1987 | Lofgren et al. | |
| 4,708,473 A * | 11/1987 | Metzdorff et al. | 356/5.04 |
| 4,915,498 A | 4/1990 | Malek | |
| 5,034,810 A * | 7/1991 | Keeler | 348/31 |
| 5,298,905 A * | 3/1994 | Dahl | 342/54 |
| 5,359,403 A * | 10/1994 | Grosmann et al. | 356/5.01 |
| 5,414,439 A | 5/1995 | Groves et al. | |
| 2001/0022636 A1 * | 9/2001 | Yang et al. | 349/65 |
| 2003/0107323 A1 * | 6/2003 | Stam | 315/82 |
| 2007/0058038 A1 | 3/2007 | David et al. | |

FOREIGN PATENT DOCUMENTS

| EP | 0 353 200 A2 | 1/1990 |
|---|---|---|
| EP | 0 750 202 A1 | 12/1996 |
| GB | 2 141 890 A | 1/1984 |

OTHER PUBLICATIONS

Decision to grant a European patent, issued Jan. 24, 2008.

* cited by examiner

*Primary Examiner*—Thomas H Tarcza
*Assistant Examiner*—Luke D Ratcliffe
(74) *Attorney, Agent, or Firm*—Steven M. Jensen; Edwards Angell Palmer & Dodge LLP

(57) ABSTRACT

A vehicle mounted imaging system and method, enabling selective imaging of objects in a low-visibility environment. The system includes a light source providing non-visible light pulses and a camera having an image intensifier enabled to gate selected received images. The light source may be a laser generator, which may be enabled to generate a pulse width related to the depth of a field to be imaged. The gated image intensifier may determine gating time spans according to the depth of a field to be imaged.

66 Claims, 19 Drawing Sheets

Sensitivity to Distance

Sensitivity to Distance

*Sensitivity to Distance − Timing Control*

*Sensitivity to Distance − Timing Control*

*Sensitivity to Distance − Timing Control*

*Sensitivity to Distance − Timing Control*

*Sensitivity to Distance – Timing Control*

*Sensitivity to Distance – Timing Control*

VEHICLE MOUNTED NIGHT VISION IMAGING SYSTEM AND METHOD

CROSS-REFERENCE TO RELATED APPLICATIONS

This application is the national phase of International (PCT) Patent Application No. PCT/IL2003/000639, filed Aug. 5, 2003, which claims priority to and the benefit of U.S. Provisional Application No. 60/400,707, filed on Aug. 5, 2002, the disclosure of each of which is incorporated herein by reference.

FIELD OF THE INVENTION

The present invention relates to the field of night imaging and display systems in general, and, more particularly, to imaging and display systems applicable for vehicular use and to operation methods implemented in such systems.

BACKGROUND OF THE INVENTION

When driving a vehicle at night, or in poor visibility conditions, the insufficient illumination generated by a vehicle's headlights and/or any ambient road lighting, nearly always limits the driver's visibility range. When driving, the driver needs a sufficient range, hence time, to identify a danger from a distance and to react accordingly. The range of vision an alert driver requires to escape danger may be calculated empirically. It is customary to calculate the range required by multiplying the driving speed by the time needed for the combined human and vehicle reaction time. This time may range from 6 to 10 seconds for highway driving to more than double for heavy off-highway vehicle, and even ten times that for trains, boats or landing aircrafts. For example, a driver cruising at a speed of 120 km/h (i.e., 33 m/sec), would need a visibility range of approximately 200-333 meters.

However, the light system of vehicles, even when the headlamps are set to the high beam lights state, will generally illuminate a distance not exceeding approximately 200 meters, i.e. approximately 6 seconds of driving at a speed of 120 km/h. However, It should be noted that the use of high beam lights or alternative high powered lights is not neither customary nor allowed for continuous driving, as it causes glare ("blinding") other drivers. The situation is worse when the headlights are set to their low beam state, as the illuminated distance will not exceed 100 meters, generally, i.e. about only 3 seconds of driving at a speed of 120 km/h. The situation is worst during off-highway driving in a dusty environment where the visibility is down to 50 meters and time to stop may be 15-20 sec, or a boat sailing inside a fogy port with 50 meters visibility and time to react of 30-60 sec.

This seems to mean that drivers are driving currently under conditions of insufficient visibility range or, at least, in a state on the borderline of the required range of safe vision, and are, therefore, endangering themselves and others. Simply improving vehicle headlights to increase their illumination range may not be a suitable solution, because blinding of other drivers should be avoided, and also due to technological limitations.

With this current state of affairs, and as a natural outcome, developments in the field of night imaging equipment in aerospace/military applications have given rise to the idea of introducing and integrating night imaging systems in vehicles, which might increase the driver's visibility range. Furthermore, display systems for images received from observation systems under conditions of deficient vision or low visibility have also improved. Outstanding examples thereof are the HUD (Head Up Display) and LCD (Liquid Crystal Display) Systems.

One technology, which might be integrated and operated in vehicles, is the thermal imaging technology. An array of detectors, sensitive to infrared radiation absorbs the heat energy emitted by bodies and creates a video image according to the absorbed heat emission. An example of thermal imaging technology is described in U.S. Pat. No. 5,414,439, titled "Head Up Display with Night Vision Enhancement". This patent describes the installation of an infrared camera in a vehicle for watching road conditions by using thermal imaging. The camera transmits a video signal to the HUD System, which displays the image on the vehicle's windshield (or any other optical combiner) located in front of the operator.

The system described in the '439 patent is based on a thermal camera, which does not offer a solution for perceiving differences in colors and shades of gray (a thermal camera displays heat distinctions and emissivity only). The system is heat sensitive and therefore, does not detect elements' temperature if equal to the road background temperature. In other words: the system does not offer the driver any help in reading signs, signposts, etc. Nor does the thermal camera exploit the extensive use of reflecting colors applied in road markings, light reflectors of vehicles, and so on. Furthermore, the thermal camera does not display the visible light (it operates in the remote infrared range). In addition, inasmuch as the system is based on an array of IR detectors operating on the remote infrared wavelengths (8 μm to 14 μm), it may not be possible to install the system inside a vehicle's driver compartment, because vehicle windows do not transmit energy in the remote IR wavelength.

Consequently, in considering an installation in a vehicle for the purpose of increasing the driver's range of vision, the disadvantages of thermal imaging technology are markedly apparent. The system is cumbersome, sensitive to various driving states, might not give a clear view of "cold" road signs, and is relatively expensive.

Another technology, which might apparently be integrated and assimilated in a vehicle, is the image intensification technology. An intensifier intensifies the available photons at the input by 50.000 to 100.000 times and enables observations in even a very dark environment. Intensification technology, however, is prone to "bloom". The image intensifier is sensitive to photons of the visible and near IR wavelengths. Consequently, an image intensifier may be bloomed by sources in the visible wavelength and the near IR entering the field of view.

Therefore, for installation in a vehicle for the purpose of increasing the driver's visibility range, this technology also has marked disadvantages. A vehicle moving on the road will, of necessity, encounter light from oncoming, preceding, and passing vehicles, as well as from street lamps. These sources emit light in both the visible and near IR spectrum. These sources might cause intensifier saturation and bloom the provided image.

An additional imaging technology that may be used for nighttime imaging is gated imaging technology. To reduce the influence of interference in the space between the night imaging system and the target, gated imaging is used, such that energy reflected from the illuminated target is absorbed only in specified time intervals. In this manner, the image displayed may be influenced by the imaging receiver input only when the reflected energy from the illuminated target actually reaches it (after having covered, at the speed of light, the distance from the target to the imaging receiver). While the illumination's beams travel the distance to the target, and while the reflected energy (beams) from the target and its adjacent environment travel the distance from the target to the imaging receiver, the imaging receiver is switched "OFF".

For application in vehicular installation aiming at increasing the driver's visibility range, the disadvantage of adding a source of light is apparent. For example, such technology may concern a system that requires radiation safety (e.g.—meeting the requirements of MPE standards) and the additional source of light should be at eye safety levels.

Night driving necessitates an increase in the driver' visibility range by implementing a system that might provide the driver with an expanded range of observation (e.g.—up to 500 meters ahead). Such a system may be required to operate in an environment saturated with sources of light in the visible and near IR wavelengths (e.g., headlights of other cars, roadside lights, other active night vision systems), while overcoming the challenge of eliminating blinding resulting from such sources of light, and without encountering radiation and other safety problems in influencing the system.

SUMMARY OF THE INVENTION

A vehicle mounted imaging system is provided, according to some embodiments of the present invention, to enable nighttime imaging as well as imaging in poor visibility conditions. The system is apt to be implemented in a wide variety of vehicle types, such as—cars, tracks, heavy off-road equipment, and even on boats, trains and aircraft (hereinafter—vehicle).

Such a system might overcome the problems of blooming from the environment, self-blooming; blooming from similar systems installed on other vehicles, and may meet the eye safety requirements. When driving at night, a driver observing the road image produced by the system might benefit from a high-quality image and from a greatly expanded visibility range, as compared to the visibility range provided to him or her by the vehicle's headlamps.

In accordance with an embodiment of the present invention, a vehicle mounted night vision system is provided which may include a source of light in the non-visible spectrum (e.g., a laser source), in order to illuminate, for example, the environment in front of the vehicle. The night vision system may also include a camera adapted for image gating, for example, a camera with a gated image intensifier. The camera may absorb the energy of the reflections from scenes illuminated by the source of light. The system might also include a display apparatus to display the image produced by the reflections absorbed in the camera.

According to another embodiment of the present invention, the system provides an optimization of the system sensitivity/programmable gain (TPG), by maximizing the system ability to absorb energy of the reflections from the far end of the depth of field to be illuminated (a range from $R_o$ to $R_{max}$), and minimizing the system ability to absorb energy of reflections from the near end of the depth of field to be illuminated (the range from $R_{min}$ to $R_o$).

According to yet another embodiment of the present invention, the source of light in the non-visible spectrum is a laser generator, which has a pulse width that is related to the depth of field to be illuminated.

According to an additional embodiment of the present invention, the time span in which the camera is switched "ON" (absorbing the reflections from the illuminated targets) is determined according to the depth of the field to be illuminated. The depth of the field to be illuminated may be considered the selected range from which reflections should be absorbed ($R_{min}$ to $R_{max}$).

The opening time of a gated image intensifier ($T_{II}$), for example, may be calculated by the depth of the field whose illumination is desired, multiplied by two, and divided by the speed of light (C). The time of the image intensifier switching into "ON" after the laser has been turned off ($T_{off}$) may be calculated by the minimum range from which no reflections to be intensified are desired ($R_{min}$), multiplied by two, and divided by the speed of light (C).

According to an embodiment of the present invention, the laser generator provides for successively narrower pulses, and yet, through implementation of the gated imaging technology, the same characteristics as with a wider pulse width are achieved.

According to some embodiments, the present invention includes a method for improving the performances of a night vision imaging system which is based on gated imaging. This improvement is achieved by providing an intensifying ability as a function of a relevant target range from the system, thereby overcoming blinding problems resulting from "irrelevant" reflections.

According to an embodiment of the present invention, providing the intensifying ability as a function of a relevant target range from the system is achieved by producing a shaped pulse, or, in other words, a patterned pulse from the source of light in the system.

According to an embodiment of the present invention, providing of the intensifying ability as a function of a relevant target range from the system is achieved by a dynamic change, wherein the dynamic change is implemented on the level of single video image frame taken by the system. Dynamic change such as opening time of the image intensifier and/or the laser pulse width.

According to another embodiment of the present invention, providing the intensifying ability as a function of a relevant target range from the system is achieved by control of the number of exposures and the laser/intensifier timing (on the level of a video image frame) and/or by processing of the image.

According to some embodiments, the present invention embodies a method for overcoming blooming from similar systems installed in passing vehicles. This is achieved by the application of statistical techniques and/or by synchronizing techniques implemented in the systems.

According to some embodiments, the present invention includes a method for meeting radiation safety requirements by adjusting the intensity of the beam emitted from the system light source with the cruising speed of the vehicle.

According to some embodiments, the present invention includes a method for overcoming blooming by local darkening of the entry into the system's camera, implemented by a spatial light modulator (e.g., MMS, LCD, Suspended Particles), with or without image intensifier (e.g., through a CMOS\CCD camera, and a narrow band pass filter adapted to the light source wavelength). In another embodiment, the present invention provides a method for overcoming blooming by utilizing light polarization.

BRIEF DESCRIPTION OF THE DRAWINGS

The present invention will be understood and appreciated more fully from the following detailed descriptions, taken in conjunction with the drawings, in which:

Drawing No. 1 is a top view illustration of a general view of the night imaging system installed in a vehicle, according to the present invention.

Figure 1:
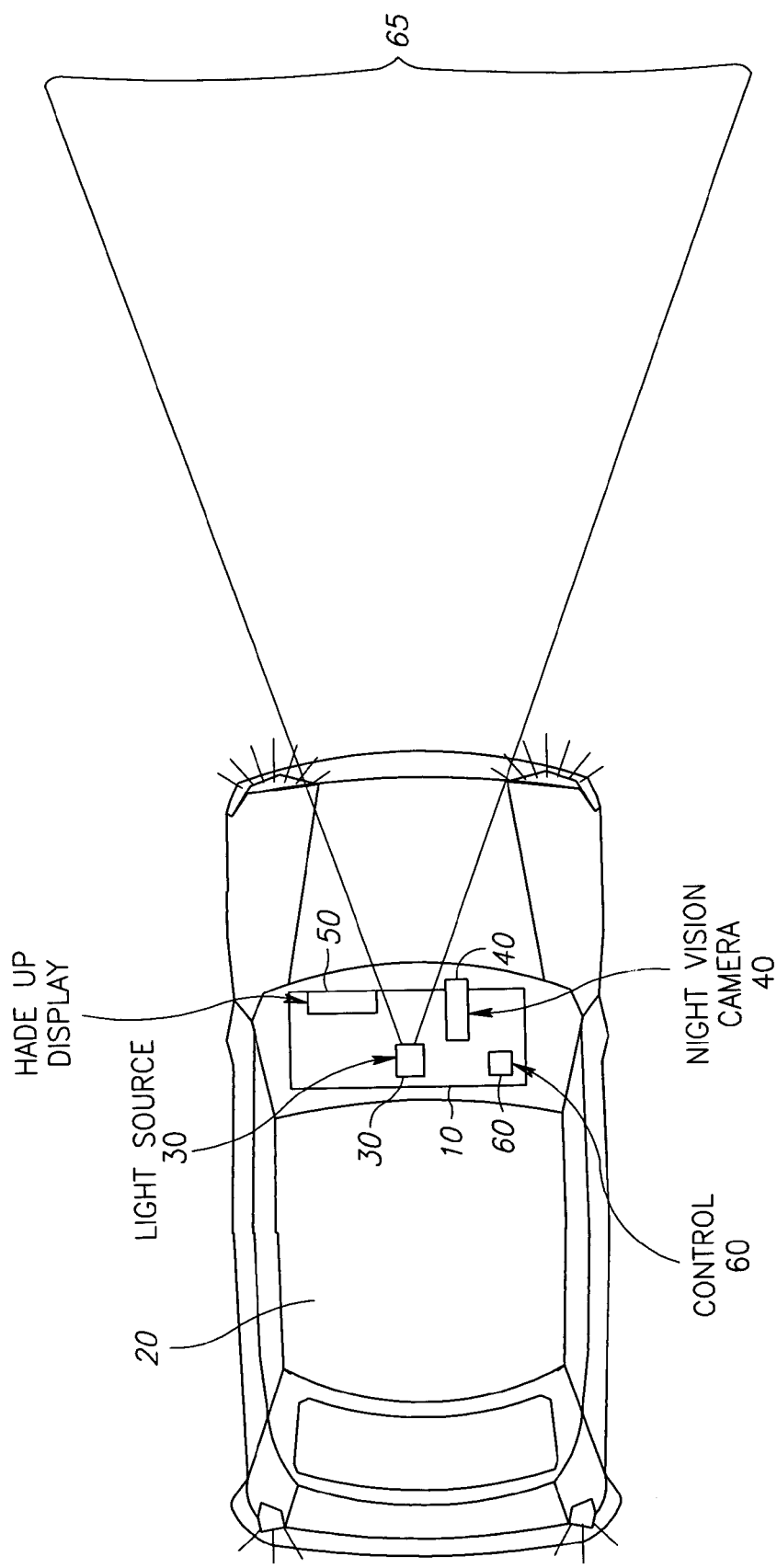
Figure 2:
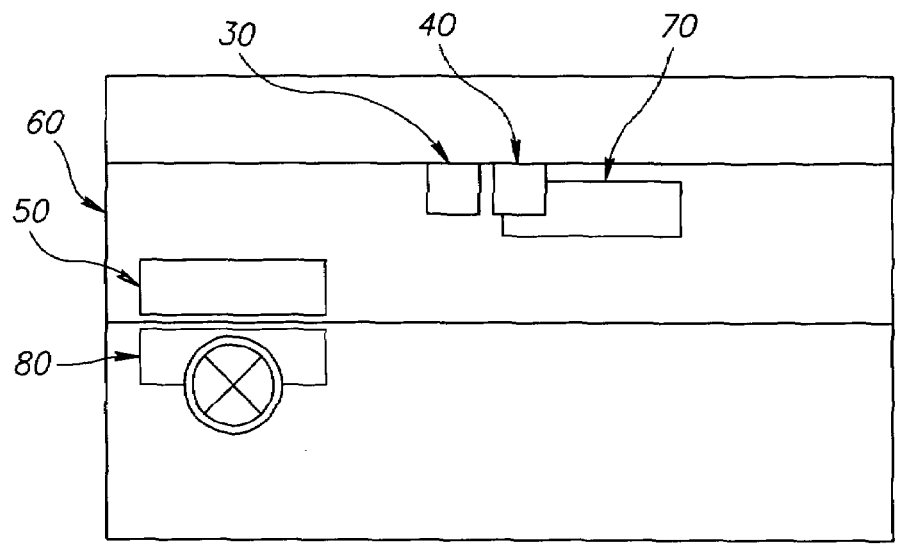
Figure 3:
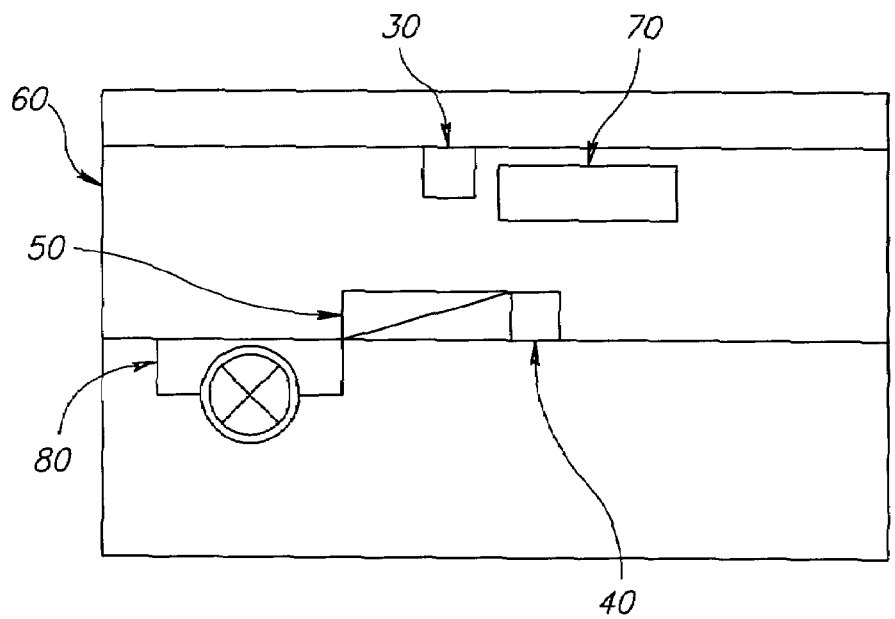
Figure 3A:
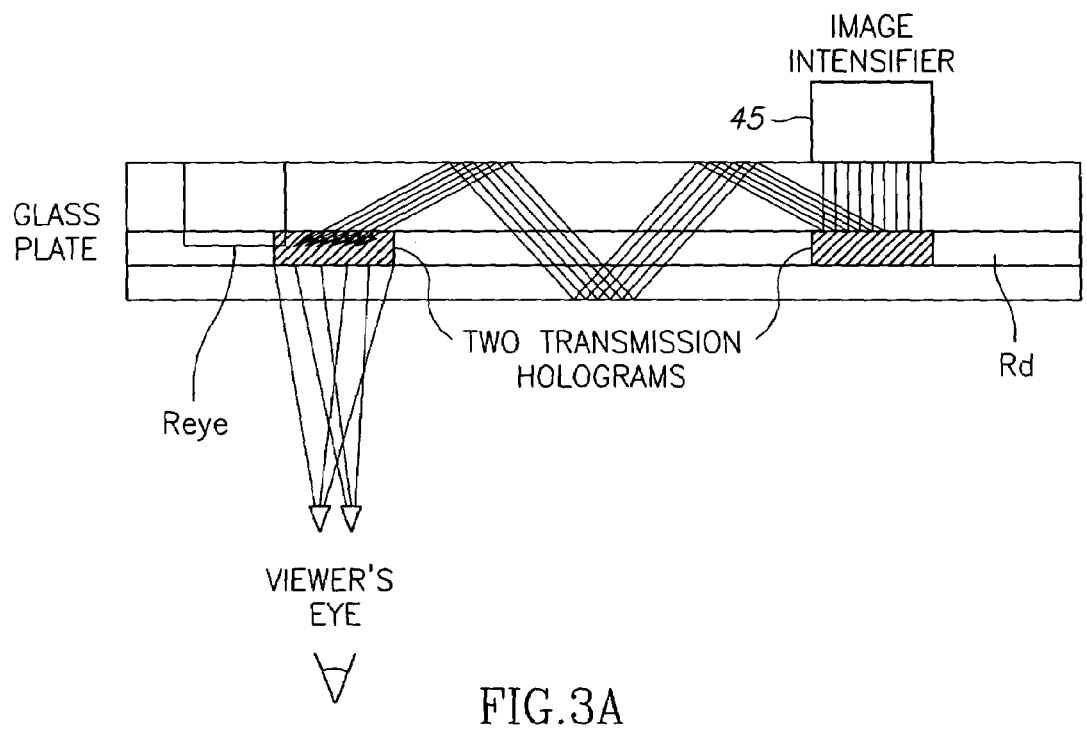
Figure 4:
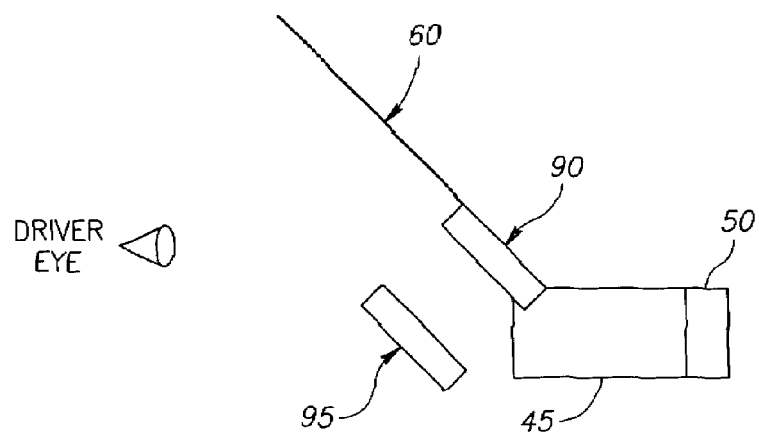
Figure 5:
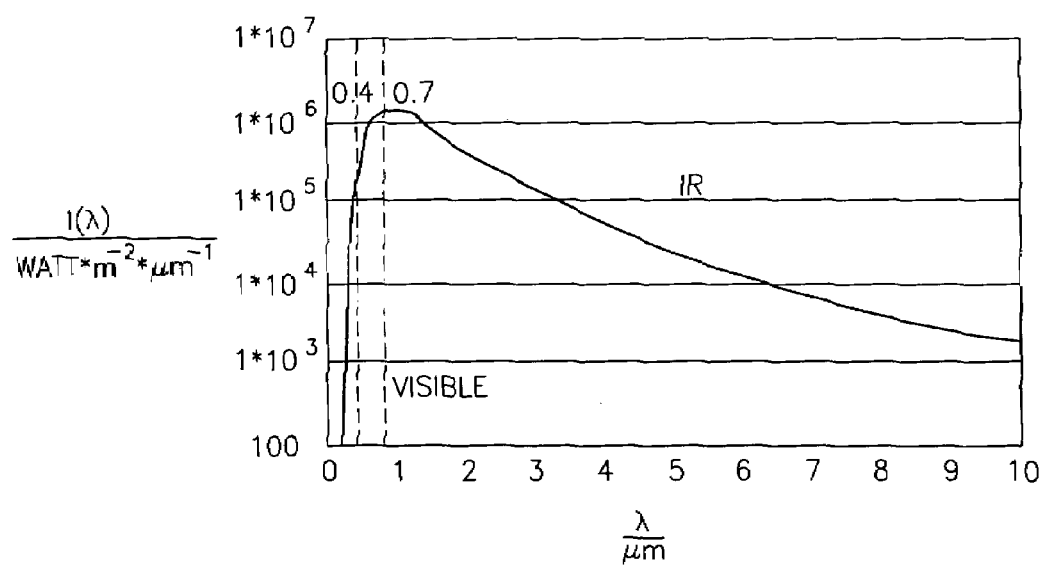
Figure 6:
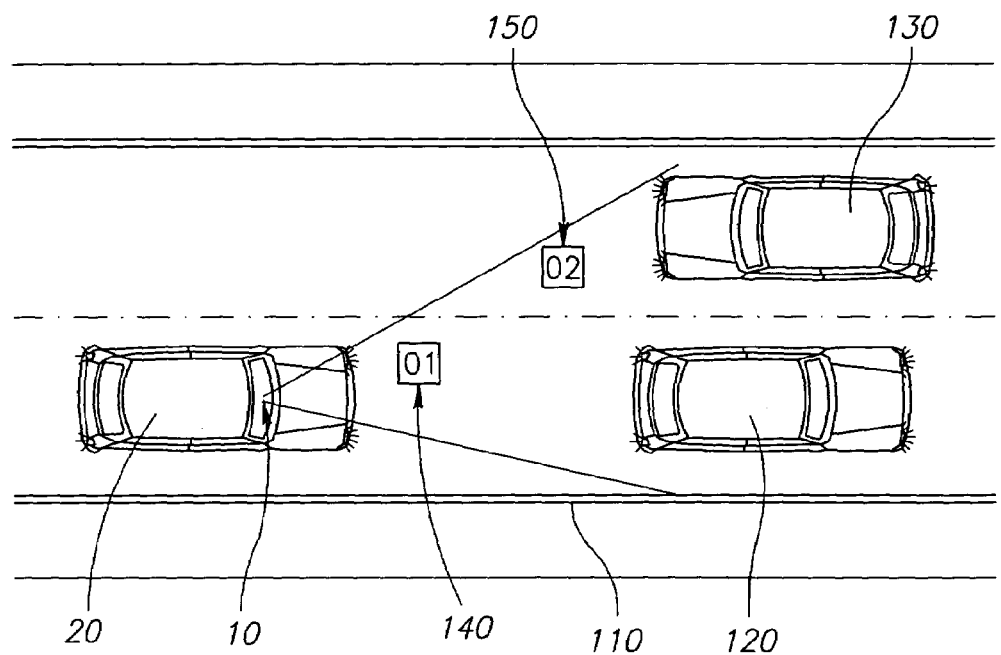
Figure 7:
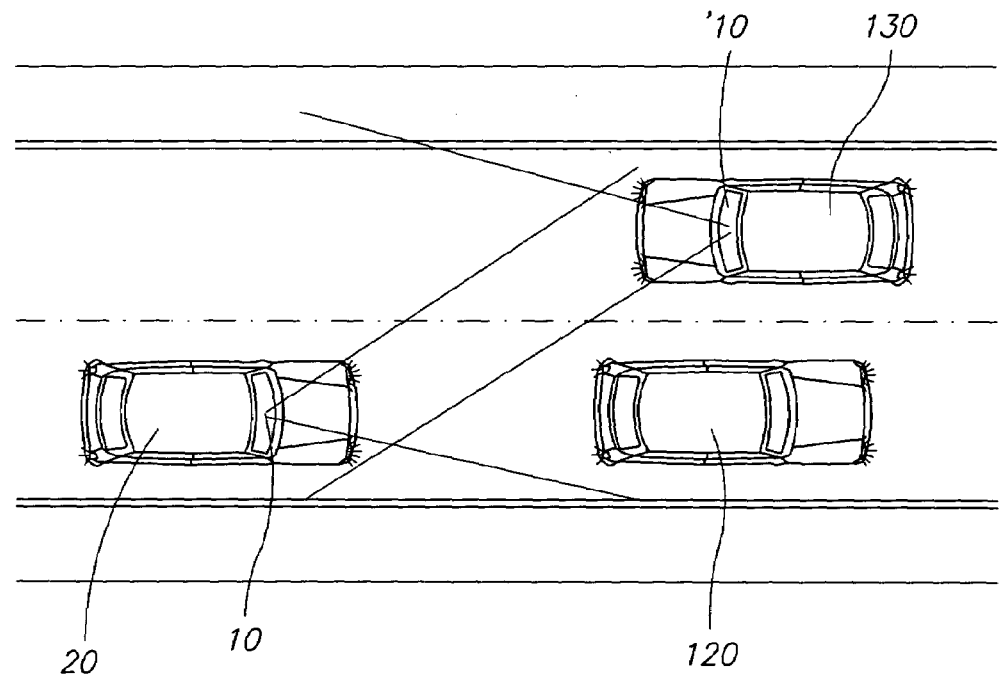
Figure 8:
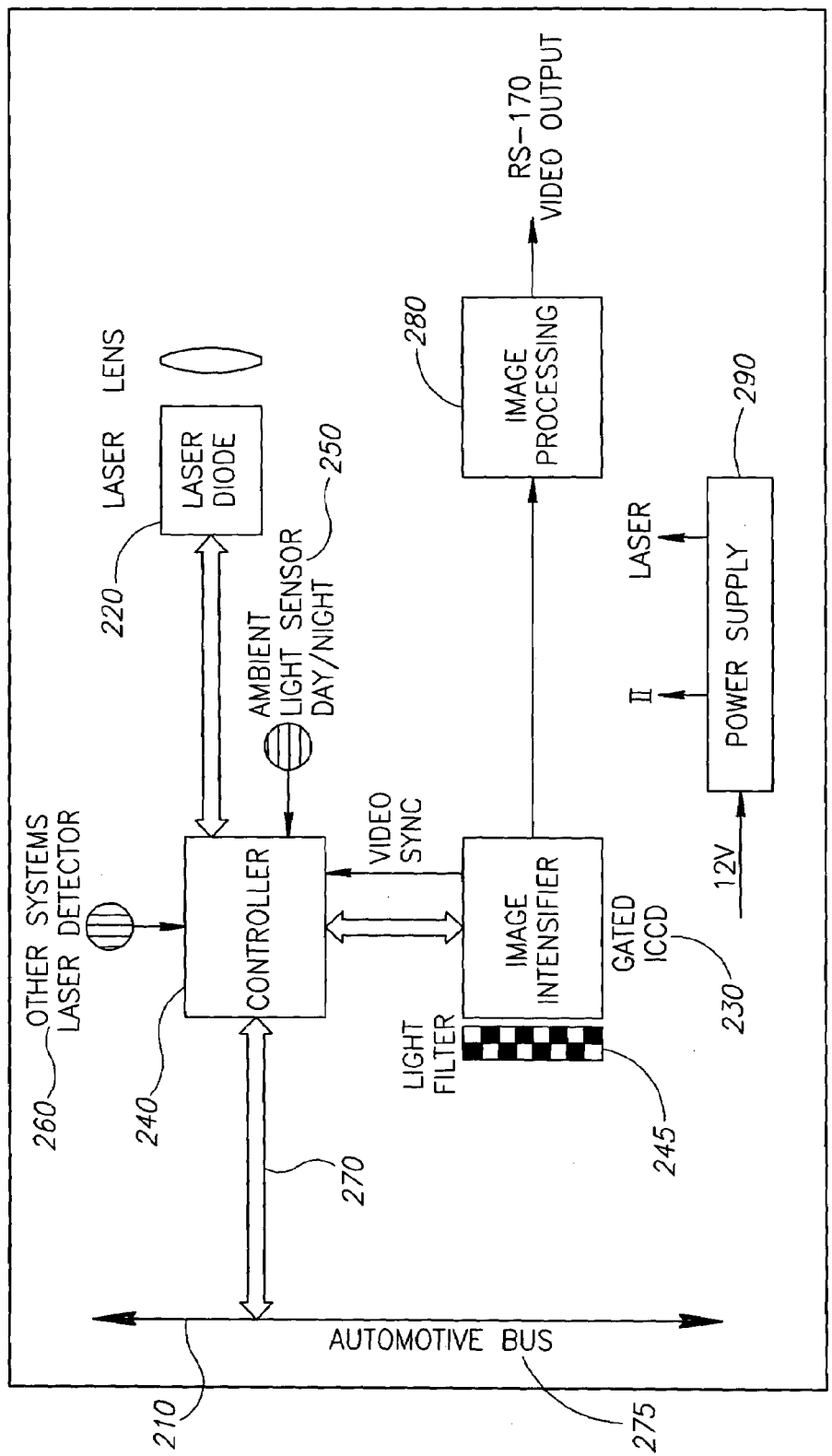
Figure 9:
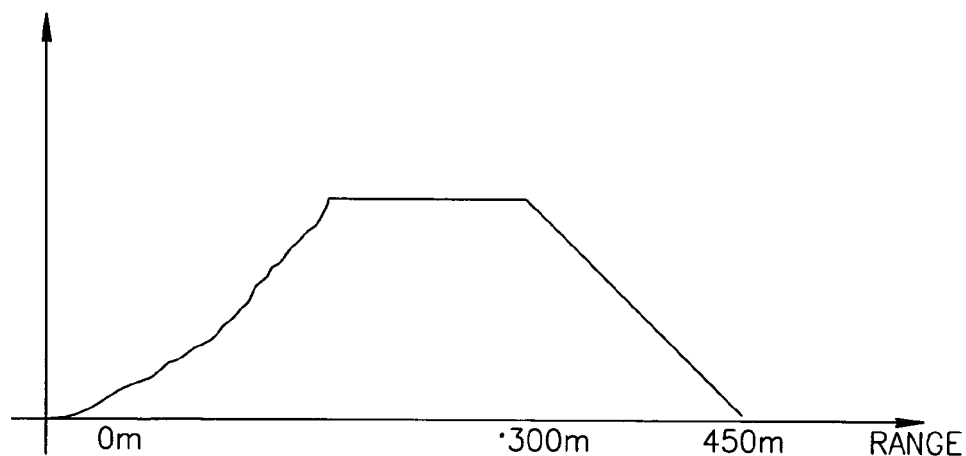
Figure 10:
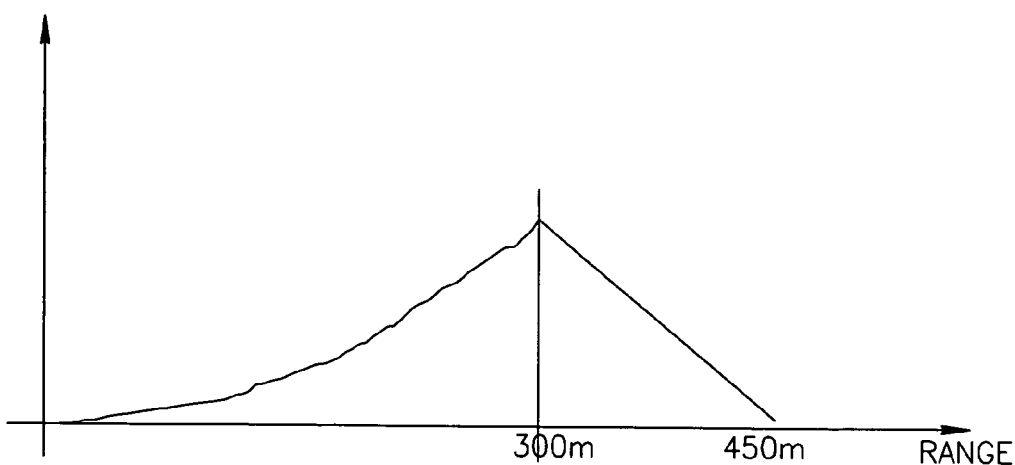
Figure 11:
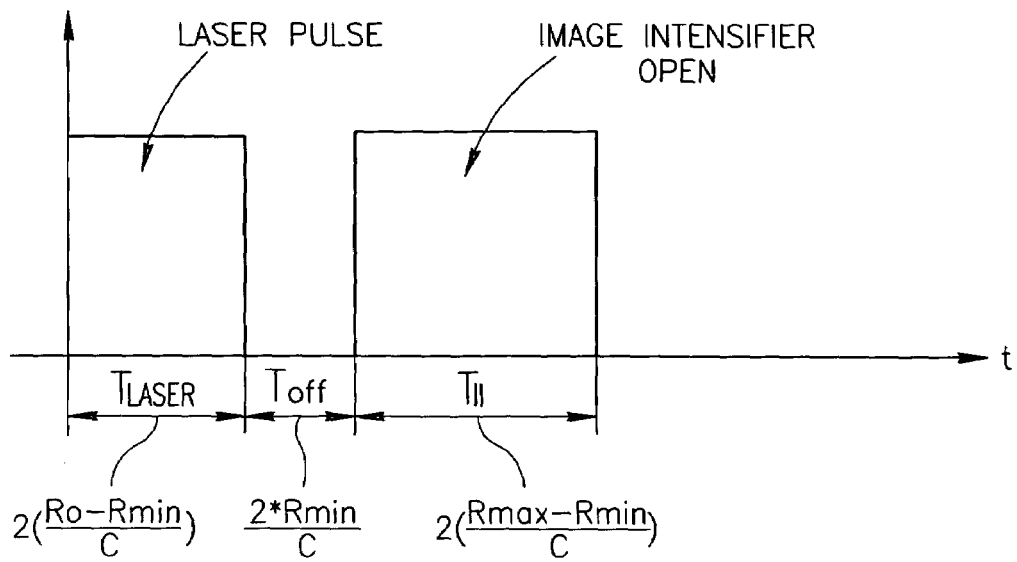
Figure 12:
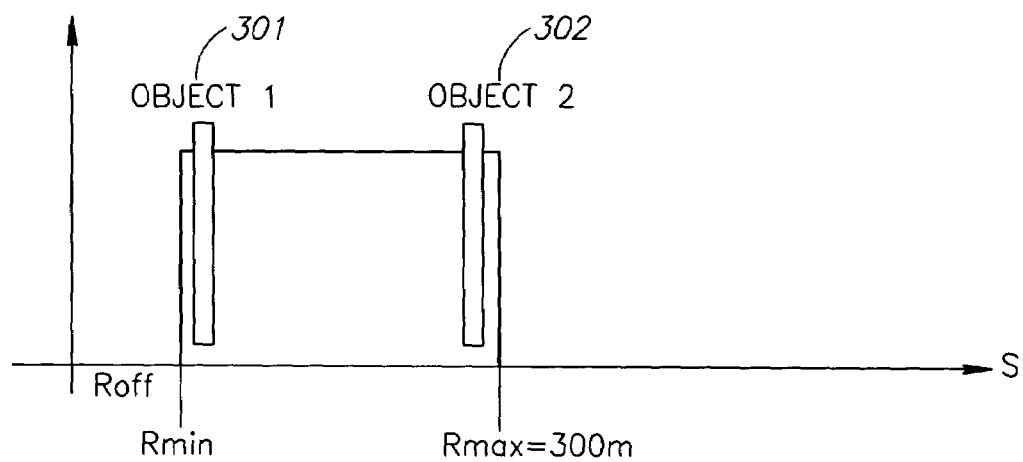
Figure 13:
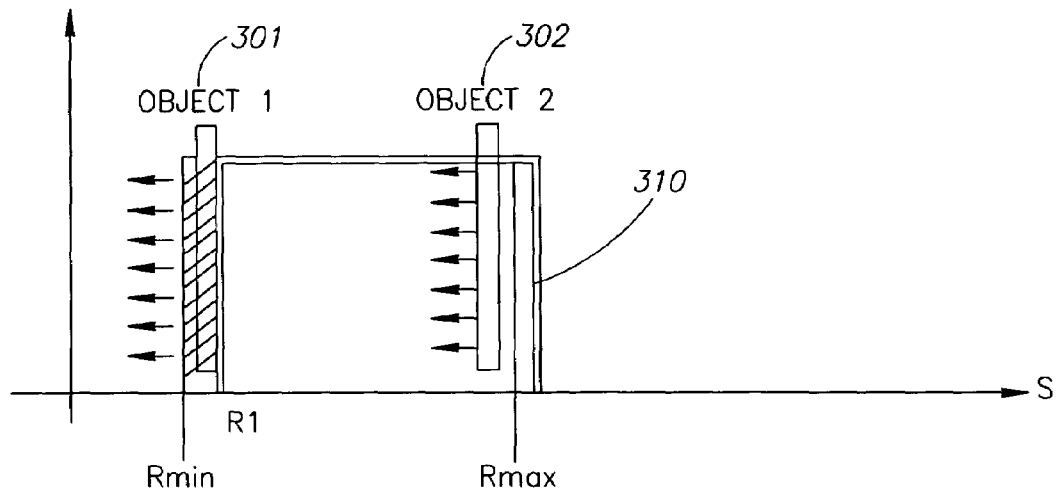
Figure 14:
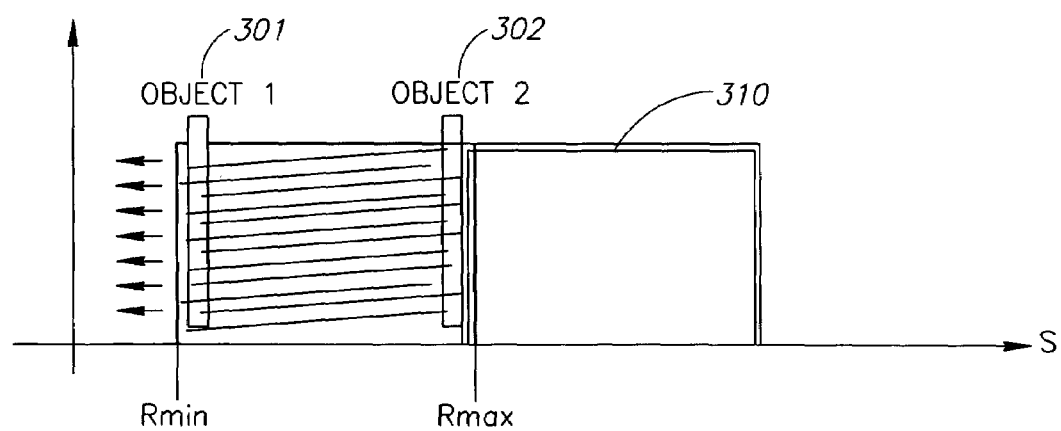
Figure 15:
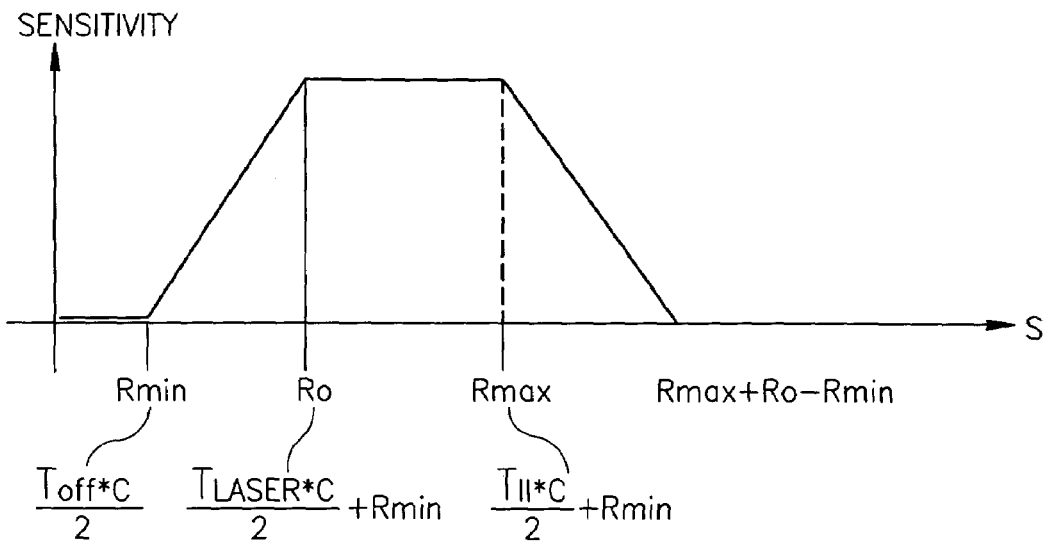
Figure 16:
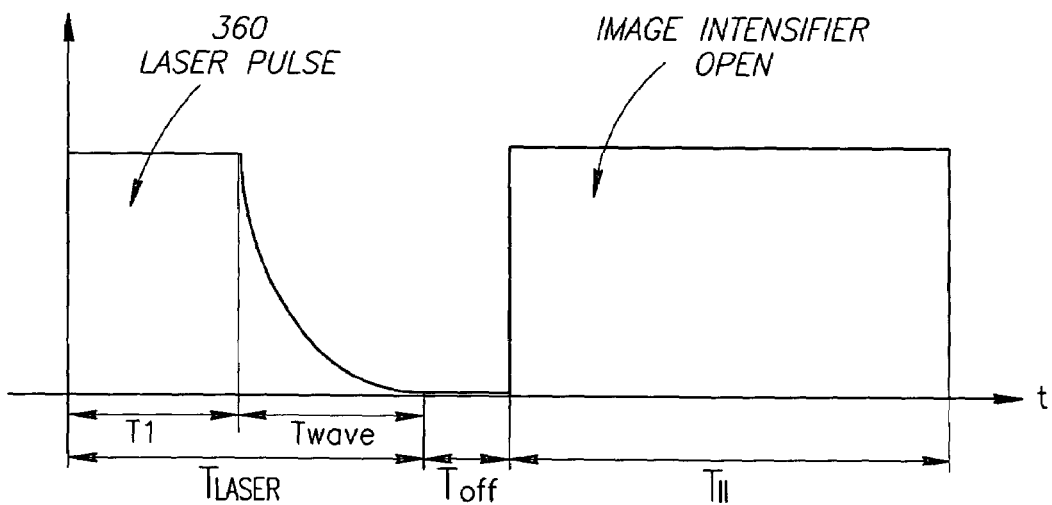
Figure 17:
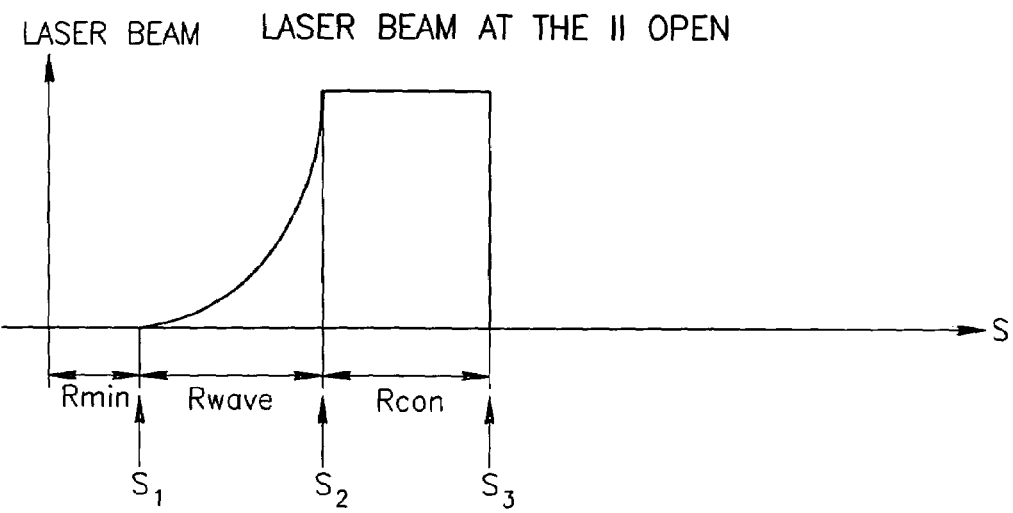
Figure 18:
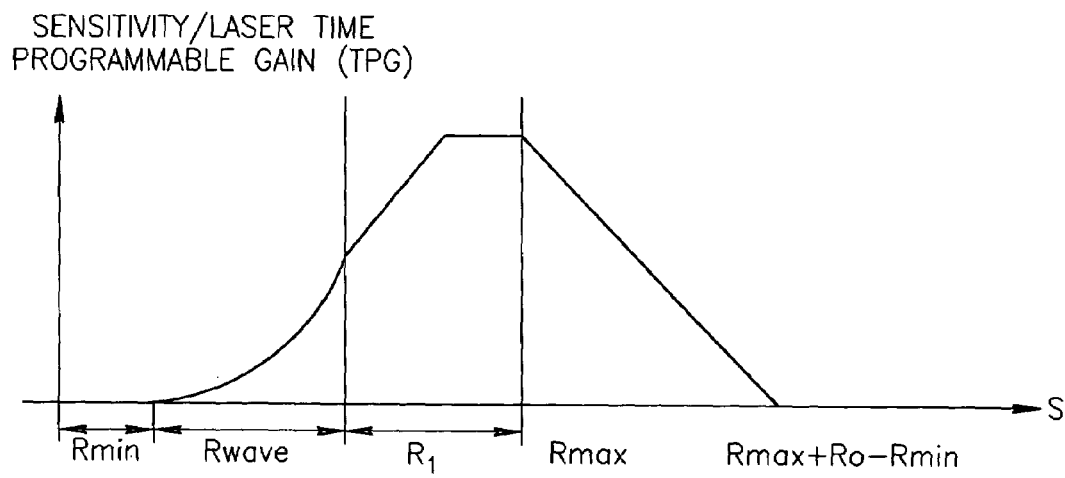
Figure 19:
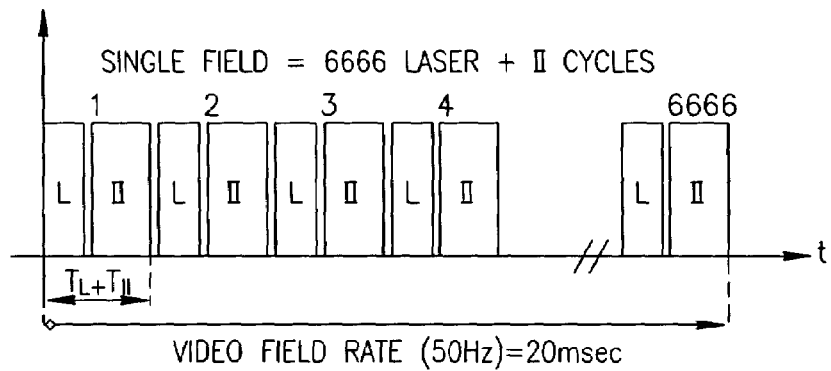
Figure 20:
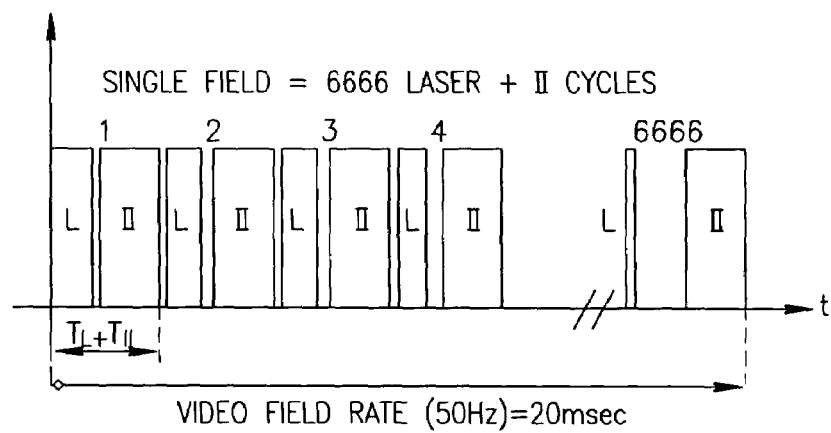
Figure 21:
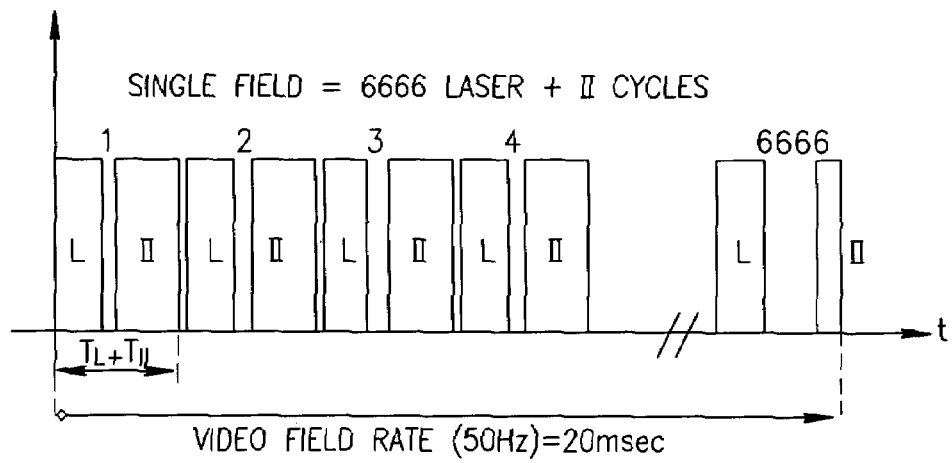
Figure 22:
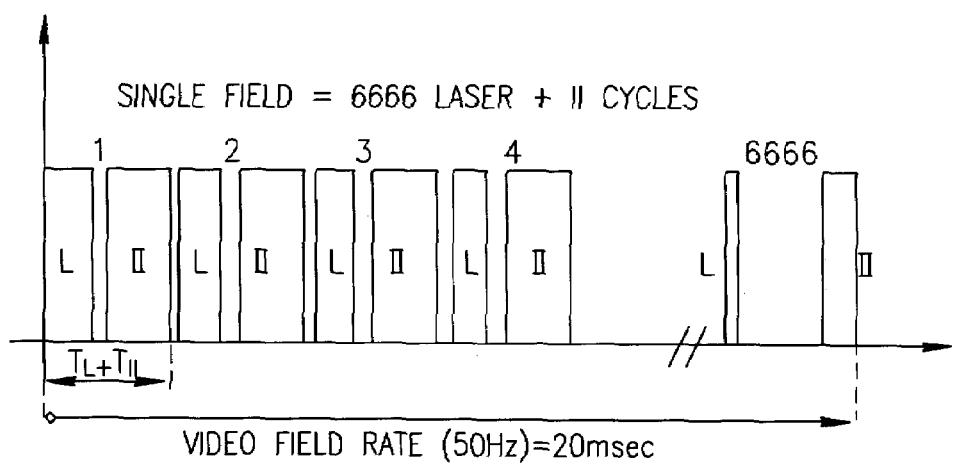
Figure 23:
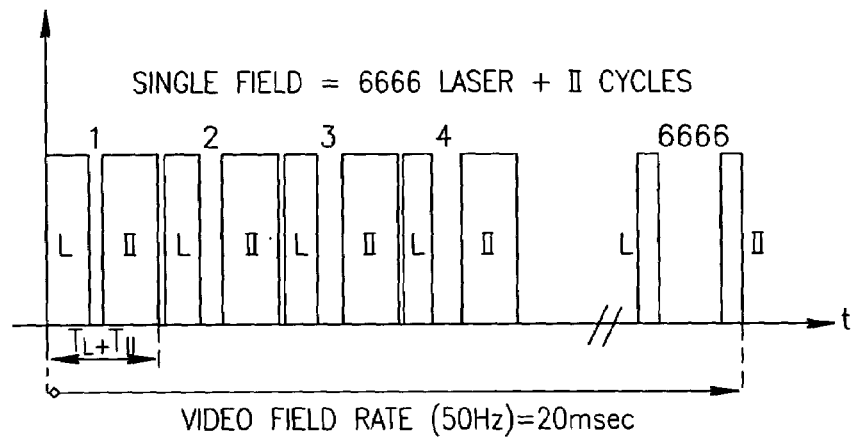
Figure 24:
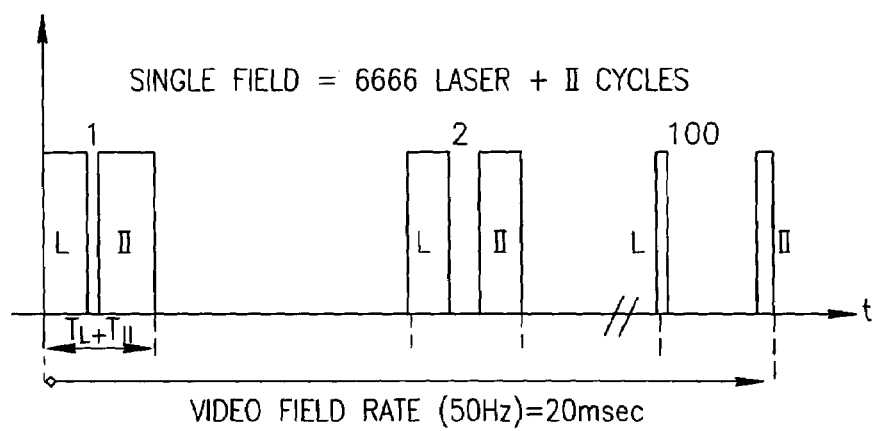
Figure 25:
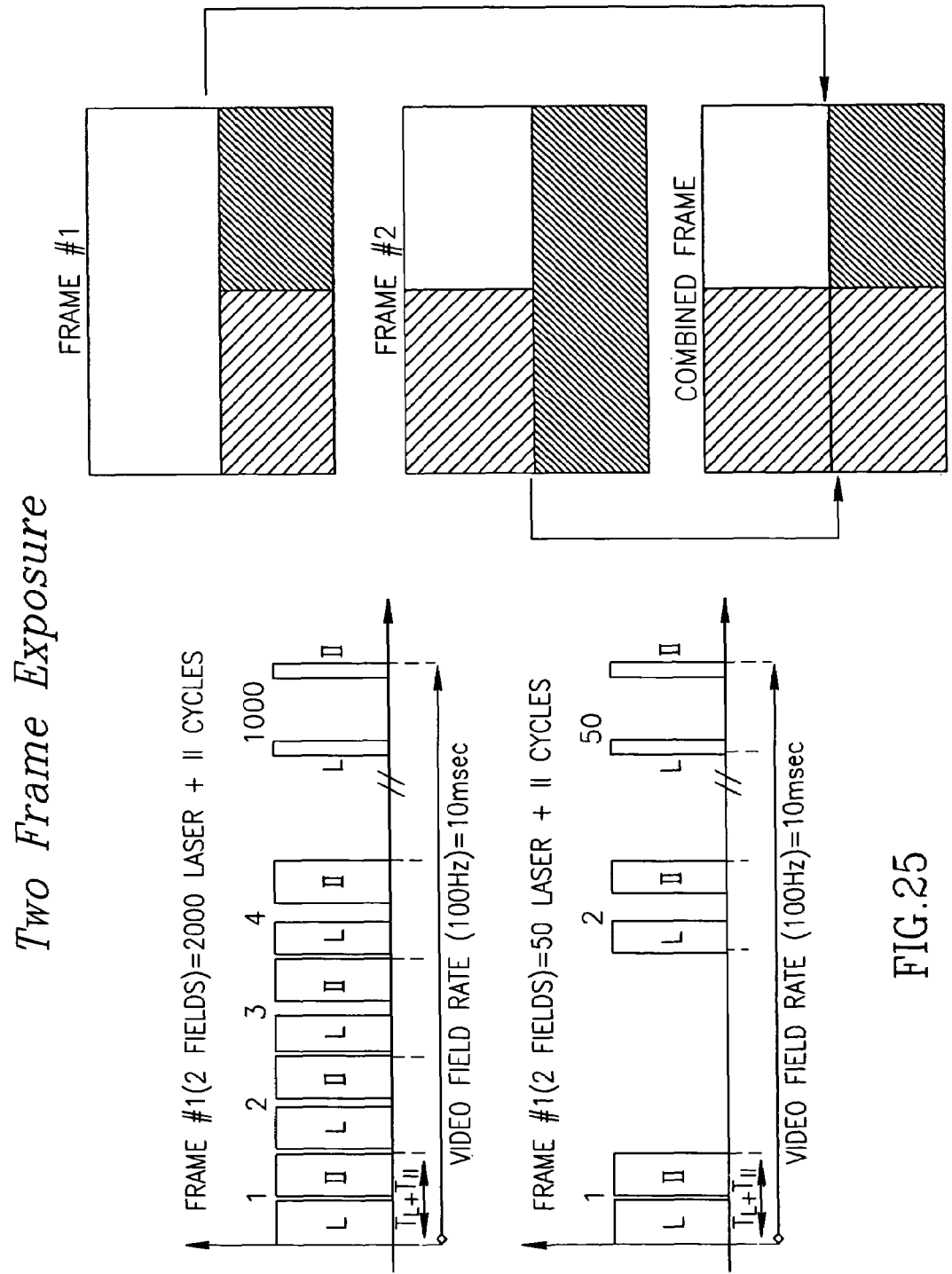
Figure 26:
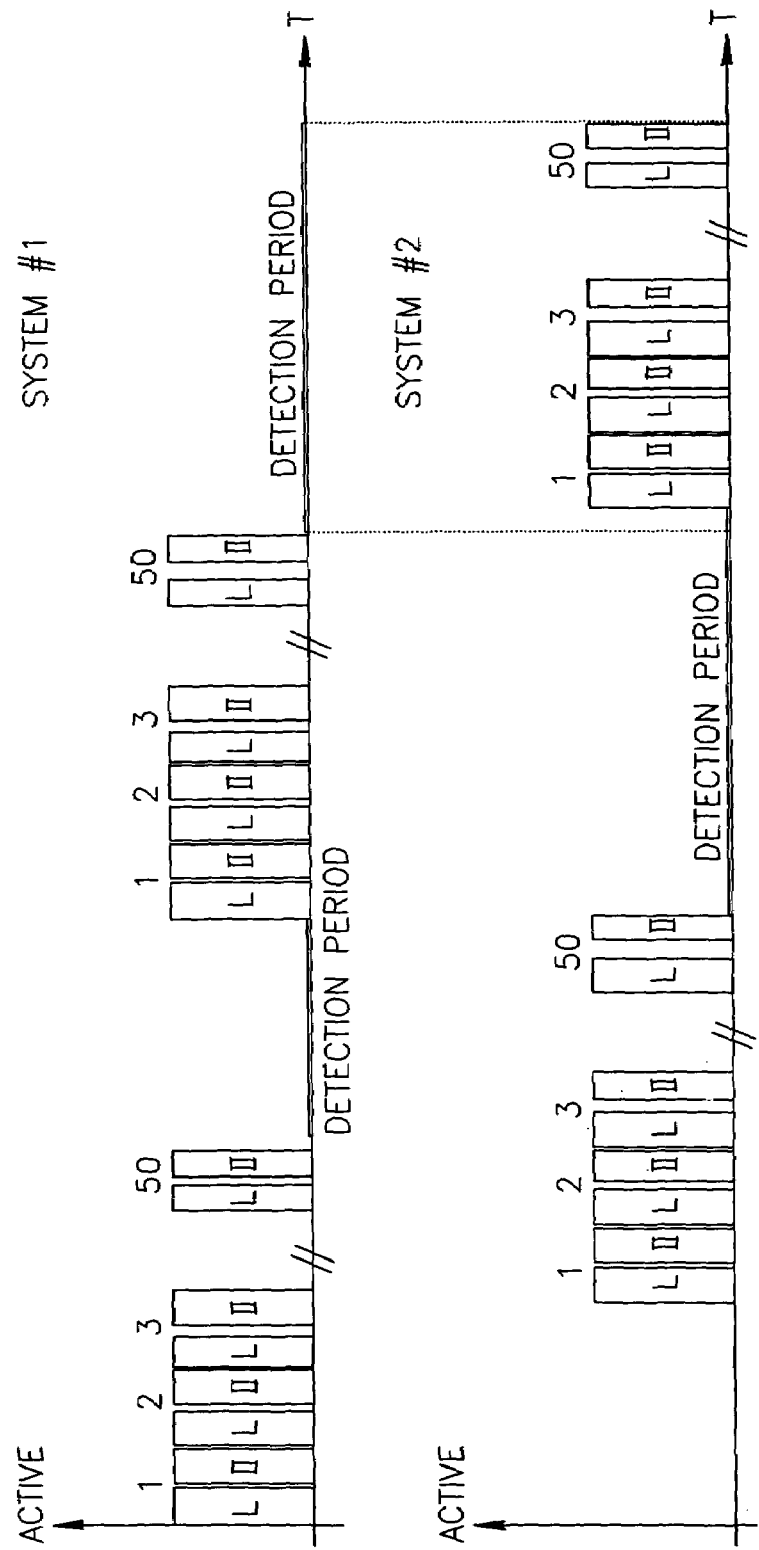
Figure 27:
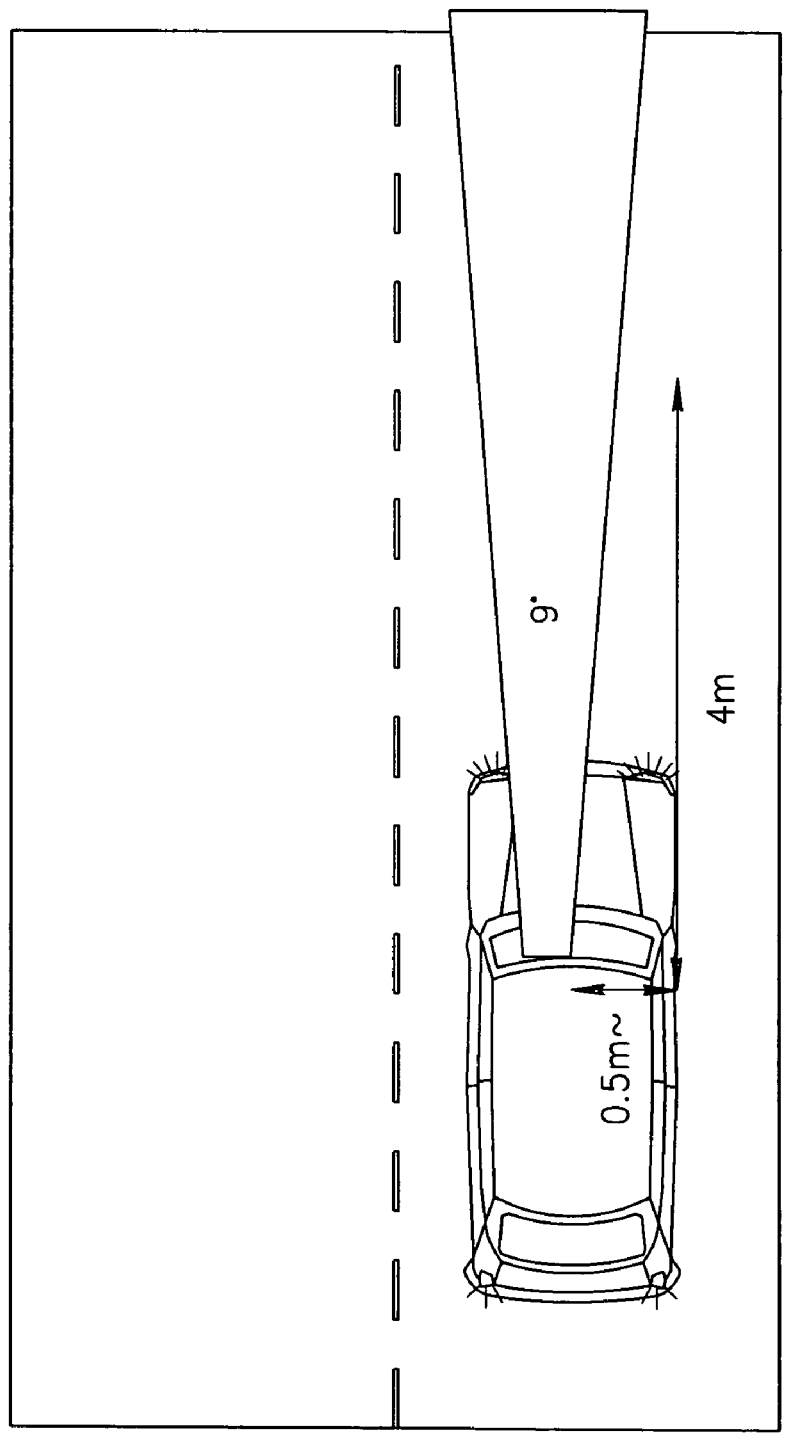
Figure 28:
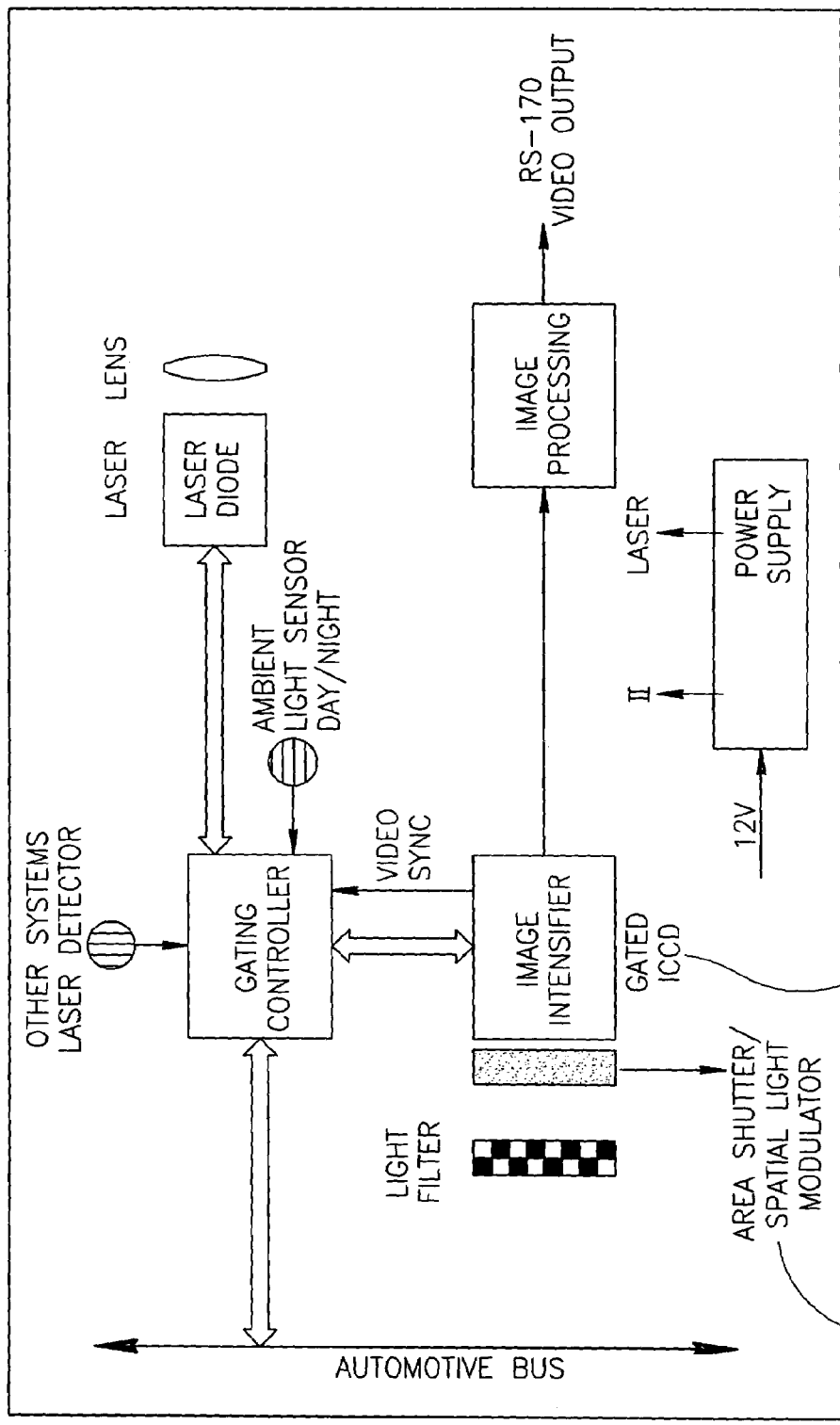
Figure 29:
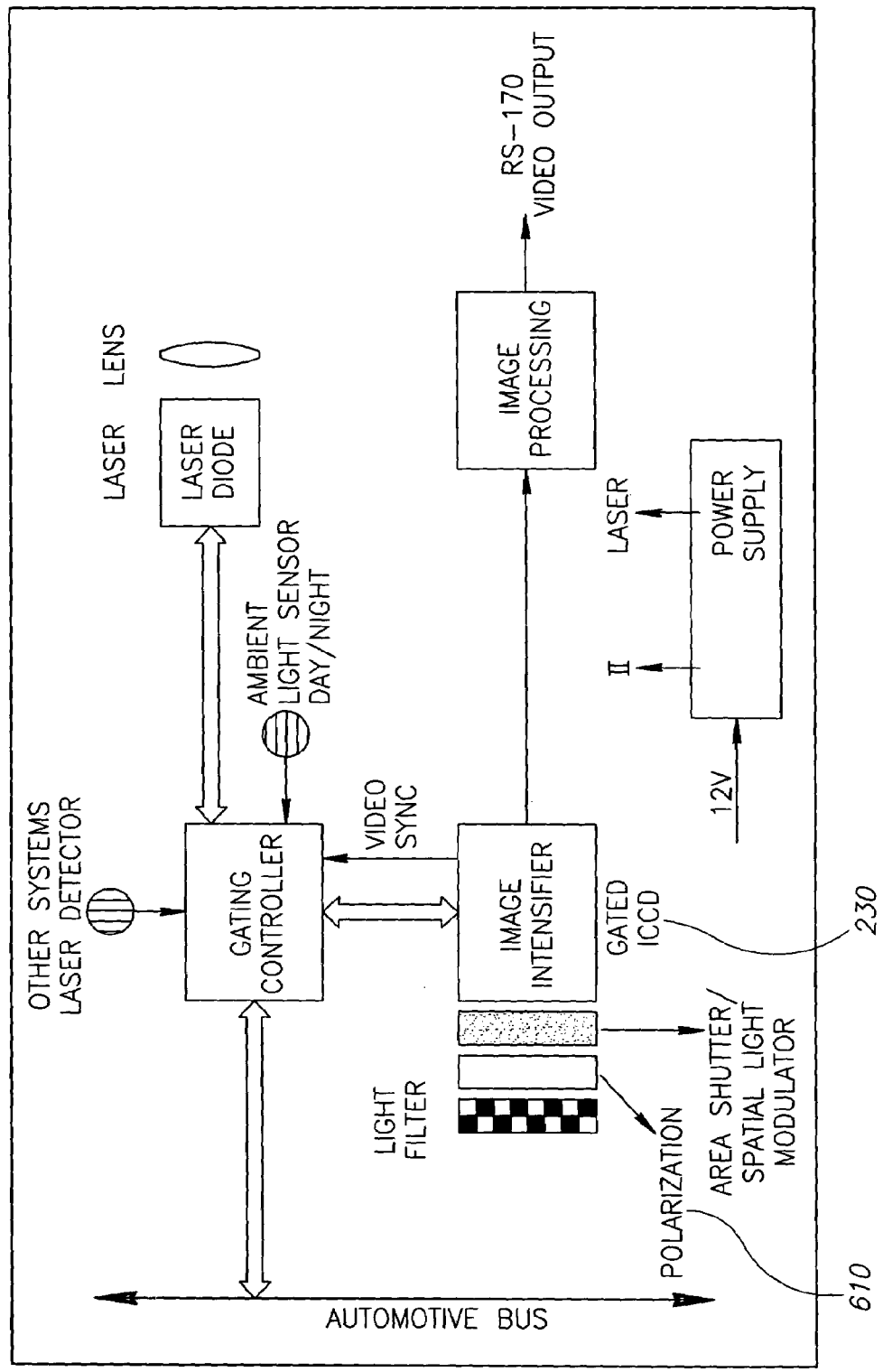

Drawings No. 2 to 4 describe various configurations of the installation inside a vehicle of a night imaging system according to some embodiments of the present invention.

Drawings No. 5 to 7 describe blinding problems which are overcome by the night imaging system according to some embodiments of the present invention.

Drawing No. 8 describes schematically an example of an embodiment of the night imaging system according to a preferred embodiment of the present invention.

Drawings No. 9-25 describe various techniques for overcoming the blooming problem, which are dealt with by the night imaging system according to some embodiments of the present invention.

Drawing No. 26 describes a specific technique for automatic synchronization, according to an embodiment of the present invention.

Drawing No. 27 illustrates the safety range of a laser beam exiting a moving vehicle, according to some embodiments of the present invention.

Drawing No. 28 illustrates a method for overcoming glare in the system by local darkening of certain areas in the camera, according to an embodiment of the present invention.

Drawing No. 29 illustrates a method for overcoming glare in the system using polarization of light, according to an embodiment of the present invention.

It will be appreciated that for simplicity and clarity of illustration, elements shown in the drawings have not necessarily been drawn to scale. For example, the dimensions of some of the elements may be exaggerated relative to other elements for clarity. Further, where considered appropriate, reference numerals may be repeated among the drawings to indicate corresponding or analogous elements throughout the serial views.

DETAILED DESCRIPTION OF PREFERRED EMBODIMENTS

The following description is presented to enable one ordinary skilled in the art to make and use the invention as provided in the context of a particular application and its requirements. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In other instances, well-known methods, procedures, and components have not been described in detail so as not to obscure the present invention.

Referring to Drawing No. 1, the drawing constitutes an illustration of a general configuration of the night imaging system 10 according to an embodiment of the present invention, installed in a vehicle 20. The vehicle may be a road-traveling vehicle, an off-road vehicle, or a vehicle for traveling in any other suitable environments. System 10 might include, for example, a light source in the preferably—non-visible wavelength, such as in the near IR wavelength 30. The system may include a camera 40 to image reflections from the light source, for example, in the IR wavelength. For example, camera 40 might be a CMOS camera or CCD imaging system etc. System 10 might include control apparatus 60, to control video camera 40 or other system components. Camera 40 may be adapted to gate images. Display apparatus 50 for displaying the images received to video camera 40 may also be provided.

The light source 30 in the non-visible wavelength, (e.g., in the near IR wavelength) 30, may illuminate a selected area, for example, in front of the vehicle 20, as, for example, indicated by range 65. It is possible to use, for example, a narrow-band source of light, such as laser. Another possibility is the use of an array of diodes, or a broadband source of light, such as an array of LED's, or even a light source providing a visible light. The light source 30 can be placed inside the vehicle (as illustrated in the drawing) or outside vehicle 20. Alternatively, light source 30 may be located in any place which may enable the transfer of the light to a selected range or target, for example (not shown in the drawing) via one or more optical fibers.

Camera 40 may receive reflections of the IR energy originating from the light source (if for example, a non-visible light source was utilized in the system), and might turn the absorbed reflected photons into a video image in the Field Of View (FOV). It is possible to use, for example, a CCD/CMOS video camera with or without image intensifier. Camera 40 may include an image intensifier, for example, in the case where the camera is directly linked to the display apparatus 50 (as is described below with respect to Drawing No. 3).

Display apparatus 50 may be included or configured in a Head Up Display (HUD), which, for example, may display the image received from the video camera 40 in front of the driver's eyes or in the driver's field of vision. This may enable the driver to simultaneously watch the road in front of him or her and the night imaging display, without having to alter his or her head orientation. Alternatively, it is possible to apply the display apparatus 50 as a lower display, for example, as an LCD display unit mounted next to the car's dashboard or in any other suitable location. The transmission of signals to display apparatus 50 may be performed in a variety of manners, for example by connecting an analog or digital video signal to the display apparatus 50, or by direct linking video camera 40 to display apparatus 50. Moreover, in order to enhance the alertness of the driver, or the clarity or effectiveness of the transmitted data, symbolic icons representing targets in a theoretical field of vision may be integrated into a displayed image or picture. For example, icons may be added to a displayed image, that might include, for example, trees, sign posts, barriers, pedestrians, etc.

Referring to Drawings No. 2 to 4, the drawings describe various configurations of mounting the night vision imaging system 10, according to an embodiment of the present invention, inside vehicle 20. Vehicle 20 might be a road-traveling vehicle, and off-road vehicle, or a vehicle for traveling in other suitable environment (such as boat in an harbor, train traveling along railroad or an aircraft approaching a landing strip or taxiing on a runway). Drawings 2 to 4 relate to system 10 described with reference to Drawing No. 1, and therefore, the same component numbers are used.

Drawing No. 2 describes a configuration in which display apparatus 50 is in a HUD configuration, which is mounted, for example, in the lower section of the vehicle window 60. Light source 30 may be installed, for example, in the upper inner section of the vehicle, next to the car's rearview mirror 70. Video camera 40 may be, for example, installed in the upper section of the vehicle (next to light source 30). It will be appreciated by persons who are skilled in the art that the light source 30 may also be installed in any other place in the vehicle (for example, in the headlamps, in the grill, in the side mirrors, or any other suitable location. Thus, in the case where the light source is packaged in a hidden place, the light can be transmitted by an optical fiber to, for example, the front of the vehicle, where the beam(s) of light may exit. The Instrument Cluster 80 of the system 10 is located, in the drawn sample, behind the instrument panel of the vehicle. Other configurations (which are not illustrated) may include the mounting of system 10 as part of a rear looking observation system in vehicles, trucks etc. (for operating while driving backwards), or the packing of system 10 within a vehicle's side mirrors or as a replacement of such mirrors.

Drawing No. 3 describes another configuration of system 10, wherein display apparatus 50 is in an HUD configuration. In this specific configuration, display 50 is installed in the center section of the vehicle front window (therefore enabling the passenger sitting beside the driver to use the system). An image intensifier 45, which may be incorporated in a camera, may be mounted close to display apparatus 50, being functionally connected to display apparatus 50, or it may be integrated within display apparatus 50. Such a configuration may obviate the need for a CCD/CMOS camera as part of assembly 40. The present configuration may apply, for example, a holographic based flat-optics technology. Such a technology is described, for example, in Patent Application Document WO9952002, and it enables transmission of the image from image intensifier 45 to an HUD 50, without the need for a CCD/CMOS camera. In the current configuration, Image Intensifier 45 is linked directly to the flat-optics and, by using holograms for example, transmits an image to a selected location, for example, in front of the driver's field of view. Moreover, an LCD display apparatus may be used, which may enable display of the image received from Image Intensifier 45.

Drawing No. 3a describes an example of an optical schema of the aforesaid holographic based flat-optics configuration.

Image Intensifier 45 may be installed anywhere in the front section of the vehicle. The light source 30 may also be mounted in this configuration, for example, in the upper inner section of the vehicle, near the car's rearview mirror 70. Similarly, in regard to this configuration, it will be appreciated by persons skilled in the art that it is also possible to mount the light source 30 in any other suitable place in or on the vehicle (for example, in the headlamps, in the grill, in the side mirrors, or anywhere else) and to conduct the light by means of an optical fiber toward the front of the vehicle, where the beam of light may be emitted).

Drawing No. 4 also describes a configuration wherein Display apparatus 50 is of the HUD type. In this specific configuration, Display apparatus 50 utilizes direct screening of the image from the Image Intensifier 45 exit to the vehicle window 60 or to projection surface 90, for example, by a reflective optical assembly 95 or projection optics, which may divert the image towards the vehicle window 60 or toward projection surface 90.

Referring to Drawings Nos. 5-7, the drawings illustrate various components and methods for avoiding "blinding" of other drivers, according to some embodiments of the present invention. The drawings concern system 10 described with reference of Drawing No. 1, and therefore, the same component numbers are used.

The implementation of a night vision imaging system in the near IR wavelength for vehicle use requires overcoming problems of blooming from the environment, self-blinding, and blinding from similar night vision systems installed in other vehicles. The description presented below with respect to the blinding phenomenon may facilitate an understanding of the techniques to overcome such problems, as will be specified hereunder in the framework of the detailed description of the invention.

The camera 40 for the IR wave length (when referring to Drawings No. 1-4) might enter into a state of saturation due to the existence of sources of light in the system's field of view, such as vehicle headlights (including the headlights of the vehicle 20, in which the system 10 is installed) and street lamps. Saturation of the camera could dazzle the night imaging system. These sources of light emit energy not only in the visible spectrum but also in the non-visible wavelength, which might cause saturation and blinding. Thus, for example, the Tungsten Halogen bulb, which is regularly utilized as a front headlight in a vehicle, emits most of its light in the IR wavelength. In Drawing No. 5, for example, the spectral emission curve of a front headlight is shown, wherein X-axis indicates the headlamps radiation wavelength, and the Y-axis indicates the emitted intensity.

Referring to Drawing No. 6, the drawing illustrates a scenario where vehicle 20, in which a system 10 according to the present invention is installed, is moving along a lane 110, where there are additional light sources, which emit energy in the near IR wavelength. In the illustrated example, the rear lights of a vehicle 120, which is currently moving in front of vehicle 20, and the front headlights of a vehicle 130, which is about to pass by vehicle 20 provide additional light sources. In the range between vehicle 20 and the blinding vehicles 120 and 130, there are two objects 140 and 150, which are absolutely identical in size, and which night vision system 10 aims to detect and image.

At the precise illustrated instant in time, the distance between object 140 and the vehicle 20 is shorter than the distance between object 150 and the vehicle 20. Therefore, in a regular situation, without implementing certain techniques which are the subject matter of the present invention, the radiation intensity, which will be reflected from object 140 to system 10, will be greater than the radiation intensity which may be reflected from object 150 to system 10. This is because the closer an object is to the source of the illumination 30 (in this case—the reflector 140); the input lens collects more light.

Following is an example of a calculation of light intensities emanating from various objects:

$P_{Light} := 100$ watt — Light source Flux
$A1 := 10 \cdot cm^2$   $A2 := 10 \cdot cm^2$ — Reflecting Object AREA
$R1 := 50$ m   $R2 := 150$ m — Reflecting Object Distance from source
$r := 0.1$ — Reflectance of Object
$\theta := 9 \cdot deg$ — Light source divergence $$I_{light} := \frac{P_{light}}{2 \cdot \pi \cdot (1 - \cos(\theta)) \text{sr}}$$ — Light Intensity $$E_{Return1} := \frac{A1}{R1^2} \text{sr} \cdot I_{light} \cdot r \cdot \frac{1}{R1^2} \quad E_{Return1} = 2.068 \times 10^{-12} \frac{\text{watt}}{\text{cm}^2}$$ Incidence from Object 1

$$E_{Return2} := \frac{A2}{R2^2} \text{sr} \cdot I_{light} \cdot r \cdot \frac{1}{R2^2} \quad E_{Return2} = 2.554 \times 10^{-14} \frac{\text{watt}}{\text{cm}^2}$$ Incidence from Object 2

Referring to Drawing No. 7, the drawing describes a scene similar to the one illustrated in Drawing No. 6. Assuming that an active night imaging system 10 ('10') is installed, as well, in vehicle 130, which may be identical to the active night imaging system 10 s installed in vehicle 20, the movement of the vehicles towards one other may expose camera 40 (see Drawing No. 1) in one of the vehicles to the emitted beam from the approaching vehicle, and vice versa.

Due to the fact that the intensity of the emitted energy is several times higher than the intensity of the energy reflected from the environment, camera 40 (see in Drawing No. 1), which is installed in each one of vehicles 10 and 130 as part of systems 10 and '10 respectively, may be saturated. The saturated camera may not enable discerning the light reflected from the environment. A similar phenomenon in camera 40 may also be caused by the rear lights of vehicle 120. A blinding problem might also occur when the system installed in vehicle 130 is different from the system 10 but still emits beams of the same or a similar wavelength.

Referring to Drawing No. 8, the drawing illustrates an embodiment of the night vision imaging system 210 according to the present invention. The system comprises a light source, such as a laser generator 220 (e.g., a diode laser); a camera including, for example, an image intensifier 230 with gating ability (e.g., a gated ICCD\ICMOS); a narrow-band filter 245 installed at the entrance to the light intensifier 230, and a controller 240, which controls the laser transmission 220 and switching of the image intensifier 230.

Optionally, system 210 also includes light sensors operating in the visible wavelength 250 for determining the level of ambient light (e.g. to identify day/night situations), a pulse detector 260 for detecting the presence of similar active night vision systems operating in the system's observed field, an interface 270 to the data channel of the vehicle's computer, and an image processing unit 280. The image-processing unit 280 may produce a video signal, which is transmitted to the display apparatus 50 of the system (not illustrated, see Drawings 1-4, assembly 50). The entire system receives power from a power supply unit 290. The power supply unit 290 receives, for example, power from the vehicle and converts the input voltage levels into required voltage levels of the above-specified system assemblies.

Laser generator 220 may serve as a light source in the near IR wavelength. The laser may illuminate the area in front of the vehicle, the observation of which is desired during driving. Illuminating in the near Infra Red wavelength, the produced image has high contrast level substantially equal to the level achieved in the visible range, which enables reading of road signs. The laser beam enhances the retro-reflective paints on the road (lane lines, stop lines etc.) and on signs as well as rear reflectors of cars. It shows all visible car and road lights.

In order for the night vision imaging system according to an embodiment of the present invention to approach maximum efficiency, the laser pulse width produced by laser generator 220 should be calculated as a function of the driver's required visibility range (see calculation example in respect of Drawing No. 11). Image intensifier 230 with gating ability can intensify the light absorbed, and might receiving an image even in a dark environment. Image intensifier 230 may enable fast switching.

Controller 240 may control laser source 220 and the image intensifier 230. The function of the controller can be to enable synchronization between the operation of laser generator 220 and the operation of image intensifier 230. The controller 240 may also enable control of the various parameters of the laser pulse, for example, control of the pulse start, control of the pulse duration (the length of the pulse), and control of the pulse mode (for example, the frequency and the rising and/or falling edge or shape or pattern of the pulse). The controller 240 might also enable fast opening and closing of the image intensifier 230 in accordance with the techniques for eliminating blinding, specified below.

Controller 240 might receive indications from a light sensor in the visible spectrum 250. Controller 240 may relate to one or more sensors (e.g.—of the photo sensor type). Sensor 250 might provide indications with respect to the level of the ambient light (e.g.—to identify day/night situations) for operating system 210 accordingly. In the event that sensor 250 identifies a night situation, it might be possible to continue using the sensor (or an additional sensor—pulse detector 260) for detecting similar night imaging systems active in the area. Detection of active systems can be crucial for synchronizing purposes and for eliminating mutual blinding, as is described below with respect to blooming prevention techniques.

Controller 240 may receive data from a vehicle's data channel, which may include information such as the cruising speed and the inclination of the steering wheel, which can be used for determining the level of the laser pulse in order to avoid safety risks (as is described below in relation to safety techniques).

An image-processing unit 280 may be provided, thereby enabling system 10 to overcome problems of image quality and blooming by image processing techniques. Image intensifier 230 with gating ability may be, for example, a gated ICCD/ICMOS camera. The video signal coming from the CCD/CMOS camera might reach the image-processing unit 280, in which a correction of the image quality and the elimination of blooming is performed, as detailed below. After processing the image, the image-processing unit 280 may output an analog or digital video signal (e.g. RS 170), for display purposes.

A narrow-band pass filter 245 may be provided, to selectively enable the transmission of light into intensifier 230. The transmission may take place only when the reflected light is approximately at the wavelength of laser 220. The system may transmit only the wavelength emitted by the laser 220, or at least, ensure that the energy reflected from the laser pulse is substantially higher than the energy approaching intensifier 230 from a source which stems from an active environmental light source. Filtering of all wavelengths, with the exception of a central wavelength of laser 220, can reduce the influence of such active environmental light (coming from CW sources or AC Lamps, such as vehicle headlights, street lamps etc.). Thus, the resistance of the system 210 to blooming might improve when incorporating a narrow-band filter 245.

However, reducing the influence of ambient light by narrow-band pass filter 245, whose central wavelength is at the wavelength of the laser 220, may not be sufficient. In such a case, additional embodiments of the night vision imaging system according to the present invention may apply additional techniques in order to improve the system's resistance to blooming, as specified below.

As clarified above with respect to Drawings 5 to 7, a night vision imaging system for vehicles that enables to intensify the reflection as a function of range from it, might reduce the risk of blinding from near reflections, and, therefore, increase the dynamic range of system 10. A night vision imaging system's performance can be improved by creating variable sensitivity as a function of range. In this way, lower intensification or lower sensitivity to reflections coming from near sources, as opposed to reflections from remote sources, can be attained.

Referring to Drawings numbers 9 to 25, the drawings illustrate techniques to overcome the blinding problem with which the night imaging system according to the present invention has to deal—by the addition of intensifying ability as a function of the range. The technique concerned is applicable, for example, in the embodiment of the present invention as described with respect to Drawing No. 8, and therefore we prefer to use identical component numbers.

Drawing No. 9 describes a sensitivity or time programmable gain (TPG) graph for a range, whereby, as the range increases, the sensitivity rises.

Drawing No. 10 describes an example of a desirable sensitivity graph for a vehicle's night vision system. For example—a reasonable requirement for a night vision imaging system intended for a vehicle cruising at high speeds (let's say 120 km/h) is the detection of a human figure at a range of about 300 meters from the vehicle in which the system is installed. Further, detection of a vehicle should preferably be detected at a range of about 450 meters from the system. The reflection level which may reach the image intensifier 230 (see Drawing No. 8) from a vehicle, may in any case be substantially stronger than the reflection coming from a human figure, because the illuminated area is different in size and reflectivity and because it may be assumed that in a vehicle there are active sources of light which enable detection (e.g.—head lights or rear lights). This indicates that there is no need for a high intensification in order to detect a vehicle at long range. Under these circumstances, the graph in Drawing No. 10 describes a function in which the sensitivity to a range of 300 meters rises, and beyond 300 meters it gradually declines, up to a distance of about 450 meters. The system may therefore receive reflections from the light pulse (e.g.—laser pulse) only when these reflections are within the range of up to approximately 450 meters. At the same time; the system may rely on the input of energy emitted from active sources of light at longer range, such as CW headlamps, which in any case radiate from vehicles at a greater distance. Also, the natural scattering of the light illumination (e.g.—laser illumination) may decrease the sensitivity in distant range.

Sensitivity, as a function of range graph, as mentioned above, may be obtainable by system 10 by application of several techniques (individually or in possible combinations).

Referring now to Drawing No. 11, which relates to a graph (on the time domain) describing one technique for obtaining sensitivity as a function of range—that of timing between the laser pulse width and the time of opening the image intensifier. For each specific range, a different overlapping time is obtained between the opening of the image intensifier and the laser illumination time.

The examples ignored the returned radiation/light attenuation by inverse square law and atmospheric conditions. In the aforesaid example, the light source is a laser generator providing a laser pulse. The laser pulse width ($T_{laser}$) may be determined in accordance with the depth of the field from which some minimum level of reflections is required ($R_o$-$R_{min}$) divided by the speed of light in the relevant medium (C) and multiplied by two. $R_o$ is the range from which, for the first time, reflections arrived at the system's image intensifier while it is at an "ON" position, wherein those reflections are the end result of the whole span of the pulse width passing in its entirety, over the target located at this $R_o$ range. Up to $R_{min}$ range, reflections emitting from targets within this range will encounter an "OF" image intensifier. The off time of the image intensifier ($T_{off}$) immediately after sending the laser pulse may prevent the input of reflections from the near range (thus preventing self-blinding by near reflections). In other words, the off time may be determined according to the range from which reflections are not desired ($R_{min}$). The off time is calculated as this range multiplied by two and divided by the speed of light (C). The off time may be determined as a function of the illumination range of the vehicle headlights (input of reflections from this range is unnecessary, as it is observable in any case by vehicle headlights.

The image intensifier open state time ($T_{II}$), in particular, the period of time during which it receives reflections from the remote range, may equal twice the depth of the filed ($R_{max}$-$R_{min}$) divided by the speed of light (C) and multiplied by two.

Referring now to Drawing No. 12, which relates to a graph (on the range domain), which illustrates the observation capability according to the example, illustrated in Drawing No. 11 $R_{min}$ is the "blind range". From this area, which is in front of the system, there may be no input of reflections generated by the laser pulse. This is because the laser pulse propagated (forward) in the air, subsequently passed the required distance to the imager while the system was still "blind" to reflections generated by the laser pulse colliding with any object while approaching this range—the image intensifier having been in the "OFF" position. Therefore, $R_{min}$ is the minimum range, from which reflections may encounter the image intensifier in an "open" state. This is the minimum range, in which the laser pulse still exists, while the image intensifier is switched to an "open" state. $R_{max}$ is the maximum range, from which the sensitivity is still at a maximum. Element 301 is an object to be found somewhat behind the $R_{min}$ range. Body 302 is an object to be found further away—at the end of the $R_{max}$ range.

To understand how the sensitivity to the range value is achieved, it may be necessary to examine how the reflections are received from those objects located at the range between $R_{min}$ and $R_{max}$ (in the illustrated example, 301 and 302).

Referring now to Drawing 13, which shows a graph (on the range domain) illustrating a specific time, at which the laser pulse 310 has just completed passing object 301 and continues advancing (it now starts passing object 302).

The reflections from object 301 may be received the moment the image intensifier of the system is turned to an open state, still before the entire pulse width 310 passes object 301. Therefore, plenty of time is provided in order to receive reflections that can be intensified from the remote object 302, but only limited intensifying time is provided for reflections from the closer object 301.

From the specific time illustrated in Drawing 13, assuming that the image intensifier was switched to an open state just a short time before energy was reflected from object 301 (as long as pulse 310 was still staying on it), and energy is also reflected continuously from object 302 (now being passed by the advancing pulse 310).

As a result of this, the total energy inputted into the image intensifier as a result of reflections from object 301 is relative to the duration of time in which the pulse passes an object 301, while the image intensifier is in an open position.

Referring to Drawing 14, the drawing shows a graph (on the range domain) that describes a later specific time, a time at which the laser pulse 310 would have just completed passing object 302 and continues its forward propagation.

From the specific instant illustrated in Drawing 14, assuming that the image intensifier stayed in the open state, reflections from object 302 (as long as pulse 310 stayed on it) and is no longer reflected from object 301 (as pulse 310 already passed it).

Consequently, it may be possible to arrive at a quantitative result in which the reflection intensity absorbed from object 302, which is to be found in the maximum range $R_{max}$, may be substantially greater than the reflection quantity received from object 301. This is because the received reflection (energy) quantity is determined according to a period of time during which the image intensifier is in the "ON" state and the object is reflecting.

In other words, the laser pulse 310 may stay on object 302 for a longer time than on object 301, in a state in which the image intensifier of the system inputs reflections. Therefore, the image intensifier inputs more energy from an object close to the maximum range $R_{max}$ (302) than from an object close to the system (301).

Drawing No. 15 is a graph of the system sensitivity as a function of the range $R_o$ is defined as the optimum range from which the sensitivity as a function of the range, for example, time programmable gain (TPG), remains constant up to the desired range $R_{max}$. In other words—$R_o$ is the optimal range of the system, from which, for the first time, reflections arrived at the system's image intensifier while it is at an "ON" position, wherein those reflections are the end result of the whole span of the pulse width passing in its entirety, over the target located at this $R_o$ range. $R_{min}$, $R_o$ and $R_{max}$ can be calculated accordingly.

$$R_{min} = \frac{T_{off} \cdot C}{2}$$
$$R_0 = \frac{T_{II} \cdot C}{2} + R_{min}$$
$$R_{max} = \frac{Tlaser \cdot C}{2} + R_{min}$$

Wherein $T_{laser}$ is the pulse time length, and $T_{off}$ is the time period in which the image intensifier remains in an "off" position after the end of the pulse transmission. Any professional skilled in the art will appreciate, that the above mentioned equations are simply derived from the calculations of $T_{off}$, $T_{II}$ and $T_{laser}$ as mentioned farther hereinabove. In addition the end results, either in time property or range values, may be refined or in other word—customize, and therefore, the pure calculation should be considered as only the present invention recommended way to substantially define those time/range values. Such refinement or customization will be described hereinafter, and could consider for example, taking into account the specific environmental conditions, the speed of the vehicle, the specific characteristics of the different targets expected to be found in different ranges, changing the form of said laser pulse, etc.

The graph illustrated in Drawing 15 may not be an ideal graph, because the fading away laser pulse illuminates objects beyond the $R_{max}$ range, although there may be no need to illuminate them. In addition, and most important for the techniques that follows, the graph illustrated in Drawing 15 may not be an ideal graph because the sensitivity remains constant between the optimum range $R_o$ up to the desired range $R_{max}$. It is possible to reduce the sensitivity of the system for receiving reflections originating from beyond the $R_o$ range by other techniques. Such techniques include changing the form or shape of the laser pulse, changing the opening timing of the image intensifier, and changing the period of time/width of the laser pulse. These techniques are described below.

Refer now to Drawings No. 16 to 18, in which graphs are provided that illustrate a technique according to which a shaped or patterned laser pulse is generated. In other words, the Drawing No. 16 to 18 illustrate the ability to change the gradient shape of the laser pulse in order to achieve maximum sensitivity of the system in the optimal required range $R_o$.

In accordance with the scenarios illustrated by Drawings 11-15, in the event that a shaped or patterned laser pulse is provided, even a smaller number of photons of the laser pulse that would be reflected from object 301 (being in the near range) and a larger number of photons to be reflected from object 302 (in the remote range) may be received by the image intensifier. This may occur because the pulse will stay on object 302 for a longer time than on object 301, and/or because of the form of the laser pulse (e.g., shaped or patterned) while the intensity of the laser at the beginning of the pulse is higher than at the end of the pulse.

Drawing No. 16 is a graph of the shaped or patterned laser pulse 360 (on the time domain, measured from the point of view of the system output). The duration of time T1 is the time in which the system transmits a laser pulse at maximum intensity. The duration of time of the $T_{wave}$ is the time span in which the intensity of the laser pulse (intentionally) declines in a shaped or patterned manner. $T_{off}$ is the time in which both the image intensifier (see Drawing 8 component 230) and the laser generator (see there component 220) are in the "OFF" position. $T_{II}$ is the time span in which the image intensifier is open and receives reflections.

Drawing No. 17 is a graph (on the range domain) of the shaped or patterned laser pulse advancement. The graph describes a specific time point—the moment in which a pulse impinges on the target within the close range ($R_{min}$), but—it is going to take the reflection an additional time ($T_{off}$ divided by two) in order to reach the image intensifier. At this time, the image intensifier starts to collect photons according to where the shaped or patterned laser pulse is to be found in the open space. Photons being in the $R_{min}$ range are photons which exited at the end of the pulse and were able to pass up to range $S_1$, at the same time at which the image intensifier opens. Photons being between range $S_1$ and range $S_2$ (in the $R_{wave}$ range) are photons which exited at the beginning of the shaped or patterned decline of the laser pulse. Photons which exited from the laser generator with maximum intensity at the beginning of the pulse illumination reached $S_3$ range (and they are traveling in the $R_{con}$ space).

It will be appreciated by persons skilled in the art that the $R_{min}$ range depends on the period of time of the $T_{off}$—the period of time from the end of the pulse to the opening of the image intensifier. Photons exiting at the end of the pulse and which may return to the camera after a shorter than $T_{off}$ period of time, may not arrive at the image intensifier in an active state. Therefore, those photons may not be intensified and a $R_{min}$ range from system may be obtained at a range from which the laser pulse reflections may not be intensified. For example, a determination that the $T_{off}$ time may be 100 nanoseconds, would result in the system not performing the intensification on the reflections coming from the near range of up to 15 meters away from it.

In addition, any person skilled in the art will understand that a "$1/R^2$" shape of a pulse may be considered as optimal, at least in terms of minimizing reflections from the close range object, while the image intensifier is in an "open" state, and the above mention "saw tooth" patterned pulse moving in the time domain, while at the same time —ignoring the laser illumination attenuation.

Drawing No. 18 is a graph of system sensitivity/TPG as a function of range, wherein the shaped or patterned laser pulse technique is applied, (see and compare Drawing No. 15, where the technique was not applied). Accordingly—$R_{wave}$ is the range from which the reflections generated by the shaped or patterned laser pulse are received and intensified, $R_1$ is the range wherein the laser pulse intensity is steady (the gradient is the result of the different overlapping passing times between the pulse and the object, as explained above in respect of Drawings 12 to 14).

Consequently, it is possible to further reduce the system sensitivity at close ranges as potentially caused by reflections originating in the near ranges, by producing shaped or patterned laser pulses and utilizing same in combination with the range and a pulse width based timing technique for opening of the image intensifier, as described above with reference to drawings 11 to 15.

Any person skilled in the art will understand that the fact that the implementation of the shaped or patterned technique enables to achieve an improvement of the system sensitivity as a function of range (in comparison with the sensitivity achieved by the gating technique per-se).

Referring now to Drawings No. 19 to 22, these graphs illustrate a technique according to which, in the course of obtaining a video frame, the opening width of the image intensifier and/or the width of the laser pulse may be changed. The starting point is the understanding, that limiting the number of illuminating pulses while not compromising the image quality, is a desired end result in order to eliminate or reduce the sensitivity of the system to ambient sources. In other words, in order to obtain maximum system sensitivity in the range of interest, the fact that it concerns a video frame based system is utilized (see, e.g., in the embodiment illustrated in Drawing No. 8—the use of gated ICCD/CMOS 230). As a technology inherently possessing controllability within a single frame level (see Drawing 8 controller 240).

In night vision imaging systems of the type discussed above, the camera for the IR wavelength (see Drawing 1 component 40, and Drawing 8 component 230) might be a standard video camera (e.g.—CCD/CMOS). Such cameras operate at a constant frequency of 50 Hz, 60 Hz etc. This means that each second the camera takes 25 or 30 frames, etc. For the sake of providing an example let it may be assumed that the camera operates at 50 Hz., which means that the duration of an individual field is 20 milliseconds. As pointed out above in respect to Drawing No. 11, the range of interest for the system may be 300 meters, and therefore the laser pulse width plus the opening width of the image intensifier add up to (for example) 3 microseconds. In order to explain the techniques—the implications of the $T_{off}$ time span may not be considered. This may require a cycle time of 3 microseconds with no time gaps (e.g., waiting times) between the end of the laser pulse and the "opening" of the image intensifier. According to the aforesaid example, it may be possible to transmit, in the course of the camera taking an individual Field, up to 6666 pulses and to collect 6666 times photons in the image intensifier.

Drawing No. 19 is a graph (on the time domain) that describes the sequence of the pulse cycles (L) and collection of the photons (II). For an individual cycle—see Drawing No. 11 (while ignoring the implication of the $T_{off}$). It may be assumed that the lower the number of cycles required for obtaining a quality image, the greater the system's ability to reduce or eliminate the influences of ambient sources may be, since increasing the number of cycles may eventually increase the potential exposure to ambient sources.

Referring now to Drawing No. 20, which relates to a graph (on the time domain) that illustrates a technique according to which the laser pulse duration is changed in a dynamic manner in the course of obtaining the individual frame. The total width of each of the cycles remains constant, although the laser pulse width becomes narrower, the more the cycles are advancing on the time domain, until the last cycle, wherein, however, the entire cycle width equals the first cycle, but the laser pulse duration is very short and the waiting time for the image intensifier to open (see in Drawing 11—the $T_{off}$ time), is very long. The rate of change, increasing the waiting time before switching the image intensifier to an "ON" state, is equal to the narrowing of the laser pulse. Thus, the range from the system, where the reflection from it is not intensified (because of the image intensifier not being active, see Drawing 11—the $R_{min}$ range), may be increased. This means that the system receives more reflections from the remote range and less from the near range, and a desired sensitivity to the range is achieved.

Refer to Drawing No. 21, a graph (on the time domain) is provided that describes a technique according to which the duration of opening of the image intensifier is changed in a dynamic manner in the course of obtaining an individual frame. Also by this technique, the total width of each of the cycles remains permanent, although the duration of the opening of the image intensifier becomes shorter the more the cycles advance on the time domain, until the last cycle, wherein, the entire cycle width equals the first cycle, but the duration of the opening of the image intensifier is very short and the waiting time for the image intensifier to open (see Drawing 11—the $T_{off}$ time), is very long. The rate of change, narrowing the opening time of the image intensifier while maintaining the laser pulse width constant, is equal along the frame. Thus, the range from the system, for which the energy reflected from it is not intensified (because of the image intensifier being not active), may be increased (see Drawing 11—the $R_{min}$ range). This means that the system inputs more reflections from the remote range and less from the near range, and once again—a desired sensitivity for the range may be achieved.

Referring now to Drawing No. 22, a graph (on the time domain) is provided which describes a technique that overcomes the disadvantages embodied in the methods described above (e.g., drawings 20 and 21). A disadvantage of the method according to Drawing No. 20 is to be found in that the time of opening of the image intensifier may remain constant, and, therefore, the system may remain sensitive to the influence of environmental light in those periods of time. A disadvantage of the method according to Drawing No. 21 may be that the laser pulse remains constant, but part of the energy may not return to the image intensifier, thereby leaving unused energy.

Also in the technique illustrated in drawing No. 22, the total width of each of the cycles remains constant, although the duration of the laser pulse becomes shorter the more the cycles advance on the time domain, and, simultaneously, the waiting time for the opening of the image intensifier (see in Drawing 11—the $T_{off}$ time) is also changing in a dynamic manner—the waiting time becomes progressively longer (e.g., at a rate of twice the duration of the laser pulse shortening). In this method, the time in which the image intensifier remains open and therefore susceptible to the influence of light emitted by the environment is shortened, thus exploiting the energy to the maximum.

Consequently, it may be possible to reduce the system sensitivity to blinding as a result of reflections originating in near ranges. To adapt the system response graph to the desired graph (see Drawing No. 15) may require a dynamic change during the process of obtaining an individual video frame—progressively changing the width of the image intensifier opening and/or the width of the laser pulse and the delay between the Image Intensifier and the laser.

It will be appreciated by persons who are skilled in the art that the aforesaid methods of affecting a dynamic change in the course of taking the frame, that the opening width of the intensifier and/or of the width of the laser pulse can be integrated and combined with the application of the method of outputting a shaped or, in other words, patterned pulse from the system's light source in the invisible range (a laser diode—in the example explained above). The combined application of the above-described techniques can contribute eventually to achieve the goal of correlating the system's actual response graph to the desired sensitivity graph.

Referring to Drawings No.'s 23-25, graphs are provided which illustrate techniques according to which it may be possible to eliminate blooming originating from sources of light of high intensity, by controlling the number of cycles or, in other words, exposures, on the individual frame level. Additionally or alternatively, implementing image-processing techniques in the system may eliminate blooming.

Referring to Drawings No. 23 and No. 24, graphs (on the time domain) are provided which show the ability of the system's controller (see Drawing No. 8—controller 240) to reduce in a dynamic manner the rate of pulse cycles (L) and collection of the photons (II).

According to the example referred to above (with reference to Drawings No. 10 to 22), in the course of the camera taking an individual Field, it may be possible to transmit, for example, up to 6666 pulses per field (or 13332 pulses per frame) and to collect photons, for example, 6666 times into the Image Intensifier. However, it may also be possible to perform fewer exposures in the course of obtaining the individual Field (see Drawing No. 24, a field in the course of which only 100 cycles of exposure were performed).

A reduction in the number of exposures might cause a smaller number of photons to be collected in the image intensifier and thus can cause darkening of the entire image so that low-reflection areas may not be visible. Therefore, the number of exposures should be dynamically controlled. It is possible to control the number of exposures by several methods, for example, according to the level of ambient light (an input which could be obtained from a sensor, such as sensor 250 in the embodiment of the present invention described in Drawing No. 8). Another control method is in accordance with the level of current consumed by the image intensifier (information which may be obtained from the power supply unit 290 shown in the embodiment of the present invention, illustrated in Drawing No. 8). Yet another applicable method is image processing, locating the areas in a state of saturation.

Referring now to Drawing No. 25, a method for image processing for a variable number of exposures in each frame is provided. For this application, a camera may be used that is faster than a standard CCD/CMOS camera. For the purpose of example, the camera may be assumed to operate at 100 Hz, meaning that the duration of time of the individual Field may be 10 milliseconds (e.g., a 20 milliseconds Frame).

This capability of the camera might enable acquisition of two frames. In one frame a large number of exposures may be obtained, and in the other frame, a small number of exposures may be obtained. In the example shown in Drawing No. 25, the dynamic method that is the subject of Drawing No. 22 may be implemented. In the first frame (2 fields) the system might perform 1000 cycles, and in the second frame (2 fields) it might perform 50 cycles. The number of cycles can be determined, as stated, by several methods, for example, according to the level of ambient light, according to the state of saturation of the image intensifier tube, or according to image processing, locating of the saturation areas.

After obtaining the two frames by image processing techniques (which are applicable in the image-processing unit 280 of an embodiment of the present invention described in Drawing No. 8), it may be possible to create from the two frames a combined frame. Dark areas may be combined from the frame with the larger number of exposures, and saturated areas may be taken from the frame with the smaller number of exposures.

According to the illustrated example shown in Drawing No. 25, it may be assumed that the size of the image is 4 pixels. In frame 1, which originates from a large number of cycles, the upper pixels became saturated (while the lower pixels retain a reasonable level of gray). In frame 2, which originates from a small number of exposures, the upper left pixel did not become saturated. In the combined image the non-saturated pixels from frame 1 and the saturated pixels from frame 2 may be combined. Thus, a combined frame may be obtained, wherein the number of saturated pixels may be smaller and the image quality may be increased.

Implementing the above method can enable enlarging the dynamic range of the system and providing a high quality image even in a saturated environment. It will be appreciated by persons who are skilled in the art that image processing may also be performed by implementing other processing methods. For example, by means of an even faster camera, it may be possible to compare more frames As pointed out above with respect to Drawing No. 7, one of the blinding problems with which the system according to the present invention can deal is the problem of blinding from similar systems. Generally speaking, the solutions to the problem may be classified into two groups—statistical solutions, which apply statistical techniques for diminishing the probability of mutual blinding, and synchronic solutions in which synchronization is performed between the systems to prevent blinding.

Possible statistical solutions for eliminating mutual blinding between similar systems passing one another (see Drawing No. 7) might include a reduction of the number of exposures in the course of obtaining frames (with a possible compensation by higher laser intensity or a higher level of intensification from the image intensifier), a random or pre-defined change in the timing of the cycles in the course of the frame, a change of the exposure frequency, or any combination of these methods.

Synchronic solutions for eliminating mutual blinding between similar systems passing one another enable such a timing, which may not create a situation of blinding. One solution may be the establishment of a communication channel between the systems (for example—in the RF range). In this way, the systems may "talk" to each other. Another solution is automatic synchronization.

Referring now to Drawing No. 26, a graph which illustrates an automatic synchronizing technique between two or more systems is provided. Synchronizing may be performed by one system entering, from time to time, into a "listening" period, in the course of which the system desists from the cyclic sequence of sending a laser pulse (L) and opening of the Image Intensifier (II). In the course of the "listening" period, the system may cease to emit laser pulses and collect input pulses (if any), which come from the other system. In the event that no pulses were received, the first system may resume activity at the end of its "listening" period. In the event that, in the course of the "listening" period, pulses were inputted from other neighboring system, the first system might wait until the end of the cyclic sequence of the other system, and may resume activity only at the end of the sequence by the other system.

In the example illustrated in Drawing No. 26, the first system, whose activity along the time domain is illustrated in the upper graph, may perform a cyclic sequence of 50 exposures and may pass into a "listening" state. In this method, synchronizing may be created between one system and the other system (see the lower graph), while approximately 50% of the possible exposure time in the frame is allotted to each system.

The synchronizing method explained above is applicable, for example, in an embodiment of a night vision imaging system according to the present invention which is described with respect to Drawing No. 8. In the vehicle in which the system is installed, it may be possible to mount, for example, two pulse detectors 260—one detector in the front part of the vehicle and the second detector in the rear part of the vehicle. With reference to Drawing No. 7, it may be possible to identify whether the similar neighboring system operates in a vehicle (130 there) moving towards the vehicle (20 there) or in another vehicle coming from behind vehicle 20. Since there is no danger of blinding from a vehicle coming from behind the system may not synchronize with it.

Synchronization might also be achieved by a sharing technique. For example, by dedicating part of the frame's "listening" time to possible illuminations coming from other systems. In order to provide reasonable images, the system might require a portion of the frame, and therefore part of the frame time can be utilized for "listening" purposes. Upon non-detection of an illuminating neighboring system, the system's controller can randomly decide when the laser generator will start illuminating within the frame span. On the other hand, upon detection, the system's controller may initiate the transmission only after the approaching illumination ends and on a randomly chosen time after that.

Another technique which is applicable in order to eliminate a possible state in which both systems may start emitting on the same time, is that each of the systems may also randomly change their pulse start transmission timing in each frame.

It will also be appreciated by persons who are skilled in the art that, with the synchronizing method, it is possible to synchronize with pulses originating from other systems which operate at different rates. Furthermore, it is possible to achieve synchronization by other methods, for example a synchronizing pulse may be transmitted by any system at any period of time, and the inputting system might adapt itself in accordance with the synchronizing pulse received.

A night imaging system according to the present invention might be required to meet selected radiation safety requirements (for example—according to the American Standard ANSI Z 136.1). Since system 10 can be designed to be installed in a moving vehicle, while it is unlikely that a person will stand in front of it, it is possible to change, according to the cruising speed, the intensity of the emitted light source (for example—the intensity of the laser generator 220 described in the embodiment which is illustrated in Drawing No. 8). Thus, the intensity of the radiation is intended to be zero and completely safe in a situation where the vehicle is not moving. The information concerning the cruising speed of the vehicle may come from the data channel of the vehicle computer (e.g., from interface 270 shown in the embodiment illustrated in Drawing No. 8). Besides the speed data, it is possible to take into consideration the steering wheel angle for adapting the light and the intensity thereof to the cruising angle and to the areas of interest of the driver.

In addition, even assuming that the light source is a laser considered as a CW, the safety range during maximum operation of system 10 may be calculated to be, for example, about 4 meters. To prevent operation while somebody is potentially within this safety range, the laser intensity may be adapted to the cruising speed of the vehicle. At slow speeds, the laser may be weakened and it may be shut off when the vehicle stops. When the vehicle is cruising at high speeds, there is no problem of meeting the safety range, since the probability that persons will be standing in front of a moving vehicle within this range is very slight.

Since a laser beam may exit in the shape of a divergent cone, the beam should not encounter any person within this range. Drawing No. 27 shows the improbability of creating a safety problem, as in the safety range from the moving vehicle 410, the laser beam exiting from the vehicle 410 is traveling at an angle which does not deviate from the width of the vehicle. Therefore, it is unlikely that a person will be in front of a moving vehicle at such a distance.

A further optional means of meeting the eye safety requirements may be the implementation of a high light source in the visible spectrum near the laser source, a light source which may cause a person being in proximity to the system to avert his or her glance from the invisible light source.

It will be appreciated by persons who are skilled in the art that it is possible to combine the method of adapting the cruising speed to the intensity of the laser, to the method of implementing an additional blinding light source in the vicinity of the laser.

Drawing 28 describes a further method to overcome blooming in the system according to Drawing No. 8, by local darkening of certain areas in the camera. At the entrance to the gated ICCD\ICMOS 230, a spatial light modulator (area shutter) 510 may be installed. Light modulator 510 may include an optical device, installed at the entrance to the light intensifier, and may enable regional blocking of the light at the entrance to the light intensifier. Such an optical device may be a liquid crystal (LC), a suspended particle display (SPD), a spatial light modulator (e.g., MMS), or any other suitable device. Using the optical device, it may be possible to eliminate penetration of light or to diminish the intensity of the light, thus preventing saturation of the camera in certain areas.

Drawing No. 29 describes an additional method to overcome blooming in the system according to Drawing No. 28, utilizing polarization of light. At the entrance to the gated ICCD\ICMOS 230, a polarization means 610 may be installed (either in combination or without shutter 510). The polarizer may only transfer light of the same polarization as the light produced by the laser source 220. As the blinding sources produce mostly non-polarized light, the energy originating from environmental sources of light may be moderated, and the immunity of the system to blooming may improve.

An additional method to overcome blooming in the system, according to an embodiment of the present invention, is the application of a CMOS\CCD camera with shutter capabilities. Such a camera might not lose energy while shutting, thereby enabling accumulation of the energy in synchronization with the laser pulse, thus providing sensitivity to the system as a function of the desired detection range. This may be similar to an embodiment described in reference to drawing no. 8, wherein a camera with gated image intensifier is installed.

It will be appreciated by persons who are skilled in the art, that the present invention is not limited by what has been particularly shown and described above. Rather, the scope of the present invention is only defined by the claims which follow. For example, many of the above embodiments refer to a vehicle traveling on a road. Other embodiments, however, may relate to vehicles traveling off-road or in any other suitable environment.

The invention claimed is:

1. A vehicle mounted imaging system, comprising:
a light source, for providing a pulse like light energy, said pulse like light energy defining a substantial pulse width ($T_{Laser}$); and
a camera, for receiving said pulse like light energy reflected from objects, said camera enabled for gated detection of said pulse like light energy reflected from objects located within a depth of field to be imaged, said depth of field having a minimal range ($R_{min}$), said camera starting to detect light energy after a delay timing substantially given by the time it takes said substantial pulse width of said pulse like light energy to reach said minimal range and complete reflecting back to said camera from said minimal range;

said system being characterized in that:

said gated detection defines an ON time span ($T_{II}$) during which said camera receives reflections from objects, an OFF time span ($T_{off}$) during which said camera remains in an off position after transmission of said pulse like light energy, and a synchronization timing defining an overlap between said ON time span and the time said pulse like light energy reflects from objects located within said depth of field to be imaged, wherein said gated detection is utilized to create a sensitivity as a function of range through said synchronization timing, such that said overlap between said pulse like light energy reflected from objects and said ON time span increases as a function of range up to an optimal range ($R_O$) of said depth of field to be imaged, thereby increasing the portion of said substantial pulse width of said pulse like light energy reflected from objects located between said minimal range and said optimal range reaching said camera during said ON time span.

2. The system according to claim 1, further comprising:
an image-processor, coupled with said camera, for producing a video signal in accordance with images obtained by said camera.

3. The system according to claim 2, wherein said image-processor comprises means for locating areas in said camera in a state of saturation.

4. The system according to claim 2, wherein said image-processor comprises means for processing a variable number of exposures.

5. The system according to claim 4, wherein said image processor receives at least two video frames, one with a high exposure number, the other with a low exposure number, determines exposure numbers for said at least two video frames, and combines said at least two video frames to form a single video frame by combining dark areas from frames with a high exposure number and saturated areas from frames with a low exposure number.

6. The system according to claim 1, further comprising:
a narrow band pass filter, coupled with said camera, for filtering said reflected pulse like light energy having selected wavelengths from reaching said camera.

7. The system according to claim 1, further comprising:
a display apparatus, for displaying images obtained by said camera.

8. The system according to claim 1, further comprising:
a spatial light modulator, coupled with said camera, for enabling regional blocking of the light entering said camera, to overcome blooming in said system.

9. The system according to claim 1, further comprising:
a blinding light source, placed near said light source, for emitting bright visible light to cause a viewer in proximity to said system to avert their gaze from said light source.

10. The system according to claim 1, wherein said gated detection is utilized to create said sensitivity as a function of range through said synchronization timing, such that said overlap between said pulse like light energy reflected from objects located beyond said optimal range and said ON time span, is maintained detectable as a function of range until a maximal range ($R_{max}$) of said depth of field to be imaged, thereby maintaining the portion of said substantial pulse width of said pulse like light energy reflected from objects located between said optimal range and said maximal range reaching said camera during said ON time span.

11. The system according to claim 10, wherein said gated detection is utilized to create said sensitivity as a function of range through said synchronization timing, such that said overlap between said pulse like light energy reflected from objects located beyond said optimal range and said ON time span, is maintained substantially constant as a function of range until said maximal range, thereby maintaining substantially constant the portion of said substantial pulse width of said pulse like light energy reflected from objects located between said optimal range and said maximal range reaching said camera during said ON time span.

12. The system according to claim 10, wherein said gated detection is utilized to create said sensitivity as a function of range through said synchronization timing, such that said overlap between said pulse like light energy reflected from objects located beyond said optimal range and said ON time span, decreases as a function of range until said maximal range, thereby decreasing the portion of said substantial pulse width of said pulse like light energy reflected from objects located between said optimal range and said maximal range reaching said camera during said ON time span.

13. The system according to claim 1, wherein
said pulse like light energy defines a pulse shape and pattern.

14. The system according to claim 1, further comprising a controller, coupled with said camera and said light source, for determining and changing at least one parameter selected from the group consisting of:
said ON time span;
said OFF time span;
said pulse width;
said delay timing;
said synchronization timing;
a pulse shape and pattern;
an exposure number; and
a frequency of exposures,
wherein the duration of said pulse width, said OFF time span, and said ON time span defines a cycle time, and
wherein at least a repetition of said cycle time forms part of an individual frame, and a number of said repetitions forms said exposure number for each said frame.

15. The system according to claim 14, wherein said controller determines said parameter according to at least one of:
said depth of field;
specific environmental conditions;
the level of ambient light:
a speed of said vehicle;
characteristics of different targets expected to be found in said depth of field;
brightness level of said frame;
image processing; and
the presence of a system similar to said system mounted on an approaching vehicle.

16. The system according to claim 14, wherein said pulse width and said ON time span are limited by said controller to eliminate or reduce the sensitivity of said system to ambient light sources.

17. The system according to claim 14, wherein
said pulse like light energy is sent for a duration of said pulse width, the opening of said camera is delayed for a duration of said OFF time span, and said pulse like light energy reflected from objects is received for a duration of said ON time span.

18. The system according to claim 17, wherein said pulse width is progressively shortened, and said delay timing is progressively lengthened, while said cycle time is not changed, for increasing said sensitivity as a function of range when accumulating reflections of pulses for an individual frame.

19. The system according to claim 17, wherein said ON time span is progressively shortened said, said delay timing is progressively lengthened, while said cycle time is not changed, for increasing said sensitivity as a function of range when accumulating reflections of pulses for an individual frame.

20. The system according to claim 17, wherein each of said pulse width and said ON time span is progressively shortened, said delay timing is progressively lengthened, while said cycle time is not changed, for increasing said sensitivity as a function of range when accumulating reflections of pulses for an individual frame.

21. The system according to 14, further comprising:
a pulse detector, coupled with said controller, for detecting pulses emitting from a system similar to said system mounted on an approaching vehicle.

22. The system according to 14, further comprising:
an interface, coupled with said controller, for interfacing with other systems of said vehicle.

23. The system according to claim 13, wherein said pulse shape and pattern comprises an intensity higher at the beginning of said pulse than at the end of said pulse, for increasing said sensitivity as a function of range.

24. The system according to claim 1, wherein
said pulse width ($T_{Laser}$) commences at a start time ($T_0$); and
said delay timing is substantially defined in accordance with the following equation:

$$T_{Laser} + \frac{2 \times R_{min}}{c}$$

where c is the speed of light.

25. The system according to claim 1, wherein said pulse width ($T_{Laser}$) is substantially defined in accordance with the following equation:

$$2 \times \left(\frac{R_o - R_{min}}{c}\right)$$

where c is the speed of light.

26. The system according to claim 1, wherein said ON time span and said OFF time span are substantially defined in accordance with the following equations:

$$T_{II} = 2 \times \left(\frac{R_{max} - R_{min}}{c}\right)$$

$$T_{off} = \frac{2 \times R_{min}}{c}$$

where c is the speed of light.

27. The system according to claim 14, further comprising:
at least one ambient light sensor, coupled with said controller, for determining the level of ambient light.

28. The system according to claim 1, further comprising:
a light polarizer, coupled with said camera, wherein said light source emits polarized light and wherein said reflections having a particular polarization are prevented from entering said camera, to overcome blooming in said system.

29. The system according to claim 14, wherein mutual blinding between said system and a similar system passing one another is eliminated by statistical solutions selected from the group consisting of:
said controller lowering said exposure number; and
said controller changing the frequency of exposures.

30. The system according to claim 14, wherein mutual blinding between said system and a similar system passing one another is eliminated by synchronic solutions selected from the group consisting of:
establishing a communication channel between said system and said similar system;
letting each of said system and said similar system go into listening modes from time to time in which said pulse like light energy is not emitted for a listening period, after said period any of said system and said similar system resume emitting said pulse like light energy if no pulses were collected during said listening period, and after said period said system and said similar system wait until an end of a cyclic sequence of pulse like light energy before resuming emitting said pulse like light energy if pulses were collected during said listening period; and
having said systems change a pulse start transmission time, pulse frequency, number of pulses, or exposure number, in said individual video frames.

31. The system according to 1, wherein said pulse like light energy is non-visible light and said light received in said camera is non-visible light.

32. The system according to 1, wherein the intensity of said pulse like energy pulses is adjusted according to said speed of said vehicle, for increasing radiation safety.

33. The system according to claim 1, wherein said light source is selected from the group consisting of:
a laser generator;
an array of laser diodes;
an array of LEDs; and
a visible light source.

34. The system according to claim 1, wherein said camera is selected from the group consisting of:
CMOS cameras;
CCD cameras;
a camera having a gated image intensifier; and
a camera with shutter capabilities.

35. The system according to claim 7, wherein said display apparatus is selected from the group consisting of:
a Head Up Display (HUD) apparatus;
an LCD display apparatus; and
a holographic based flat optic apparatus.

36. The system according to claim 8, wherein said spatial light modular is selected from the group consisting of:
an area shutter;
a liquid crystal; and
a suspended particle display.

37. An imaging method for a vehicle mounted system, the method comprising the procedures of:
emitting from a light source a pulse like light energy to a target area, said pulse like light energy defining a substantial pulse width ($T_{Laser}$);
receiving by a gated camera at least one image from a reflection of said pulse like light energy reflected from objects located within a depth of a-field to be imaged, said depth of field having a minimal range ($R_{min}$);

gating detection of said at least one image, wherein the gating starts to detect said pulse like light energy after a delay timing substantially given by the time it takes said pulse width of said pulse like light energy to reach said minimal range and complete reflecting back to said camera from said minimal range; and intensifying said at least one images received, said method being characterized in that:

said gating detection defines an ON time span ($T_{II}$) during which reflections from objects are received by said camera, an OFF time span ($T_{off}$) during which said camera remains in an off position after transmission of said pulse like light energy, and a synchronization timing defining an overlap between said ON time span and the time said pulse like light energy reflects from objects located within said depth of field to be imaged, wherein said procedure of gating detection is utilized to create a sensitivity as a function of range for said vehicle mounted system, through said synchronization timing, such that said overlap between said pulse like light energy reflected from objects and said ON time span increases as a function of range up to an optimal range ($R_0$) of said depth of field to be imaged, thereby increasing the portion of said substantial pulse width of said pulse like light energy reflected from objects located between said minimal range and said optimal range reaching said camera during said ON time span.

38. The method according to claim 37, wherein said pulse like light energy defines a pulse shape and pattern.

39. The method according to claim 37, further comprising the procedure of determining and changing at least one parameter selected from the group consisting of:

said ON time span;
said OFF time span;
said pulse width;
said delay timing;
said synchronization timing;
a pulse shape and pattern;
an exposure number; and
a frequency of exposures, wherein the duration of said pulse width, said OFF time span, and said ON time span defines a cycle time, and wherein at least a repetition of said cycle time forms part of an individual frame, and a number of said repetitions forms said exposure number for each said frame.

40. The method according to claim 39, wherein said procedure of determining is performed according to at least one of:

said depth of field;
specific environmental conditions;
the level of ambient light;
a speed of said vehicle;
characteristics of different targets expected to be found in said depth of field;
brightness level of said frame;
image processing; and
the presence of a system similar to said system mounted on an approaching vehicle.

41. The method according to claim 39, wherein said pulse width and said ON time span are limited to eliminate or reduce said sensitivity to ambient light sources.

42. The method according to claim 39, wherein said procedure of determining comprises the sub-procedures of:

sending said pulse like light energy for a duration of said pulse width;

delaying the opening of said camera for a duration of said OFF time span; and receiving said pulse like light energy reflected from objects for a duration of said ON time span.

43. The method according to claim 42, wherein said procedure of determining comprises shortening said pulse width progressively, and lengthening said delay timing progressively, while retaining said cycle time unchanged, for increasing said sensitivity as a function of range when accumulating reflections of pulses for an individual frame.

44. The method according to claim 42, wherein said procedure of determining comprises shortening said ON time span progressively, and lengthening said delay timing progressively, while retaining said cycle time unchanged, for increasing said sensitivity as a function of range when accumulating reflections of pulses for an individual frame.

45. The method according to claim 42, wherein said procedure of determining comprises shortening said pulse width and said ON time span progressively, lengthening said delay timing progressively, while retaining said cycle time unchanged, for increasing said sensitivity as a function of range when accumulating reflections of pulses for an individual frame.

46. The method according to claim 38, wherein said pulse shape and pattern comprises an intensity higher at the beginning of said pulse than at the end of said pulse, for increasing said sensitivity as a function of range.

47. The method according to claim 37, wherein said procedure of emitting from a light source commences at a start time ($T_0$); and said delay timing is substantially calculated in accordance with the following equation:

$$T_{Laser} + \frac{2 \times R_{\min}}{c}$$

where c is the speed of light.

48. The method according to claim 37, wherein said pulse width ($T_{Laser}$) is substantially calculated in accordance with the following equation:

$$2 \times \left( \frac{R_o - R_{\min}}{c} \right)$$

where c is the speed of light.

49. The method according to claim 37, wherein said ON time span and said OFF time span are substantially calculated in accordance with the following equations:

$$T_{II} = 2 \times \left( \frac{R_{\max} - R_{\min}}{c} \right)$$

$$T_{off} = \frac{2 \times R_{\min}}{c}$$

where c is the speed of light.

50. The method according to claim 39, further comprising the procedure of eliminating mutual blinding between said system and a similar system passing one another by statistical solutions selected from the group consisting of:

lowering said exposure number; and changing the frequency of exposures.

51. The method according to claim 39, further comprising the procedure of eliminating mutual blinding between said system and a similar system passing one another by synchronic solutions selected from the group consisting of:

establishing a communication channel between said system and said similar system;

letting each of said system and said similar system go into listening modes from time to time in which said pulse like light energy is not emitted for a listening period, after which period any of said system and said similar system resume emitting said pulse like light energy if no pulses were collected during said listening period, and after which period said system and said similar system wait until an end of a cyclic sequence of pulse like light energy before resuming emitting said pulse like light energy if pulses were collected during said listening period; and having said systems change a pulse start transmission time, pulse frequency, number of pulses, or exposure number in said individual video frames.

52. The method according to claim 37, further comprising the procedure of image processing by locating areas in said camera in a state of saturation.

53. The method according to claim 37, further comprising the procedure of image processing for a variable number of exposures.

54. The method according to claim 37, wherein said procedure of image processing comprises the procedures of:

taking at least two video frames, one with a high exposure number, the other with a low exposure number, by image processing of a variable number of exposures;

determining exposure numbers for said at least two video frames; and combining frames to form a single video frame by combining dark areas from frames with a high exposure number and saturated areas from frames with a low exposure number.

55. The method according to claim 37, wherein said procedure of emitting from a light source comprises emitting non-visible light and said procedure of receiving by a gated camera comprises receiving non-visible light.

56. The method according to claim 37, further comprising the procedure of adjusting the intensity of said pulse like light energy according to a speed of said vehicle, for controlling radiation safety.

57. The method according to claim 37, further comprising the procedure of placing a blinding light source near the light source emitting said pulse like light energy.

58. The method according to claim 37, further comprising the procedure of displaying said at least one image on a display apparatus for displaying images constructed from said pulse like light energy received by said gated camera.

59. The method according to claim 37, further comprising the procedure of determining ambient light in said target area.

60. The method according to claim 37, further comprising the procedure of determining if other light pulses are present in said target area.

61. The method according to claim 37, further comprising the procedure of filtering received wavelengths of received reflections using a narrow band pass filter.

62. The method according to claim 37, further comprising the procedure of overcoming glare from light pulses by locally darkening the entrance of said camera.

63. The method according to claim 37, further comprising the procedure of overcoming glare from light pulses by polarizing light emitted by said light source and preventing said reflections having a particular polarization from entering said camera.

64. The method according to claim 37, wherein said procedure of gating detection is utilized to create said sensitivity as a function of range for said vehicle mounted system, through said synchronization timing, such that said overlap between said pulse like light energy reflected from objects located beyond said optimal range and said ON time span is maintained as a function of range until a maximal range ($R_{max}$) of said depth of field to be imaged, thereby maintaining the portion of said substantial pulse width of said pulse like light energy reflected from objects located between said optimal range and said maximal range reaching said camera during said ON time span.

65. The method according to claim 64, wherein said procedure of gating detection is utilized to create said sensitivity as a function of range for said vehicle mounted system, through said synchronization timing, such that said overlap between said pulse like light energy reflected from objects located beyond said optimal range and said ON time span, is maintained substantially constant as a function of range until said maximal range, thereby maintaining substantially constant the portion of said substantial pulse width of said pulse like light energy reflected from objects located between said optimal range and said maximal range reaching said camera during said ON time span.

66. The method according to claim 64, wherein said procedure of gating detection is utilized to create said sensitivity as a function of range for said vehicle mounted system, through said synchronization timing, such that said overlap between said pulse like light energy reflected from objects located beyond said optimal range and said ON time span decreases as a function of range until said maximal range, thereby decreasing the portion of said substantial pulse width of said pulse like light energy reflected from objects located between said optimal range and said maximal range reaching said camera during said ON time span.

* * * * *